(12) United States Patent
Sathish

(10) Patent No.: US 8,527,584 B2
(45) Date of Patent: Sep. 3, 2013

(54) METHOD AND APPARATUS FOR PROVIDING SERVICE MOBILITY ACROSS SERVICE DEPLOYMENT BOUNDARIES

(75) Inventor: Sailesh Kumar Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 187 days.

(21) Appl. No.: 13/074,281

(22) Filed: Mar. 29, 2011

(65) Prior Publication Data

US 2012/0254289 A1    Oct. 4, 2012

(51) Int. Cl.
*G06F 15/16* (2006.01)

(52) U.S. Cl.
USPC .......................................... 709/203; 709/201

(58) Field of Classification Search
USPC ........................................ 709/202, 203, 228
See application file for complete search history.

(56) References Cited

U.S. PATENT DOCUMENTS

| | | | |
|---|---|---|---|
| 7,237,205 B2 | 6/2007 | Sarel | |
| 2001/0018349 A1* | 8/2001 | Kinnunen et al. | 455/456 |
| 2002/0065797 A1* | 5/2002 | Meidan et al. | 707/1 |
| 2002/0112035 A1* | 8/2002 | Carey et al. | 709/219 |
| 2008/0294617 A1* | 11/2008 | Chakrabarti et al. | 707/5 |
| 2009/0006268 A1* | 1/2009 | Tanner | 705/36 R |
| 2009/0063372 A1 | 3/2009 | Lu et al. | |
| 2009/0063506 A1 | 3/2009 | Cho et al. | |
| 2009/0063568 A1* | 3/2009 | Choe et al. | 707/104.1 |
| 2009/0070159 A1* | 3/2009 | Ahvenainen et al. | 705/7 |
| 2009/0131080 A1 | 5/2009 | Nadler et al. | |
| 2010/0229190 A1 | 9/2010 | Koo et al. | |
| 2011/0102173 A1 | 5/2011 | Husain | |
| 2011/0153369 A1* | 6/2011 | Feldman et al. | 705/4 |
| 2011/0153676 A1* | 6/2011 | Wu | 707/802 |

* cited by examiner

*Primary Examiner* — Hassan Phillips
*Assistant Examiner* — Siren Wei
(74) *Attorney, Agent, or Firm* — Ditthavong Mori & Steiner, P.C

(57) ABSTRACT

An approach is provided for providing recommendations based on a recommendation model and a context-based rule. A recommendation platform receives a request for generating at least one recommendation, the request including at least one user identifier, at least one application identifier, or a combination thereof. Next, the recommendation platform determines at least one recommendation model associated with the at least one user identifier, the at least one application identifier, or a combination thereof. Then, the recommendation platform determines at least one context-based recommendation rule. Then, the recommendation platform processes and/or facilitates a processing of the at least one recommendation model, the at least one context-based recommendation rule, or a combination thereof for generating the at least one recommendation.

20 Claims, 18 Drawing Sheets

METHOD AND APPARATUS FOR PROVIDING SERVICE MOBILITY ACROSS SERVICE DEPLOYMENT BOUNDARIES

BACKGROUND

Service providers and device manufacturers (e.g., wireless, cellular, etc.) are continually challenged to deliver value and convenience to consumers by, for example, providing compelling network services. One area of development has been deployment of multiple instances of such services. For example, a service may deploy multiple instances of a recommendation system based on multiple deployment constraints to provide users with suggestions or recommendations for content, items, etc. available within the services and/or related applications (e.g., recommendations regarding people, places, or things of interest such as companions, restaurants, stores, vacations, movies, video on demand, books, songs, software, articles, news, images, etc.). Moreover, these service deployments or instances can be operated independently (service boundaries based on deployment constraints such as different operational areas, sets of users, etc.). Accordingly, service providers and device manufacturers face significant technical challenges to enabling the operation of multiple service deployments while avoiding overlap between the deployments.

SOME EXAMPLE EMBODIMENTS

Therefore, there is a need for an approach for providing mobility and/or continuity of service (e.g., in terms of quality of service, user preferences, settings, etc.) when crossing service deployment boundaries.

According to one embodiment, a method comprises receiving a service request from a device. The device has migrated from a first deployment of a service to a second deployment of the service. The method also comprises determining a first set of one or more service components associated with the first deployment and a second set of one or more service components associated with the second deployment. The method further comprises processing and/or facilitating a processing of the first set to conform to the second set using at least one translation model. The method further comprises causing, at least in part, processing of the service request at the second deployment based, at least in part, on the conforming of the first set to the second set.

According to another embodiment, an apparatus comprises at least one processor, and at least one memory including computer program code, the at least one memory and the computer program code configured to, with the at least one processor, cause, at least in part, the apparatus to receive a service request from a device. The device has migrated from a first deployment of a service to a second deployment of the service. The apparatus is also caused to determine a first set of one or more service components associated with the first deployment and a second set of one or more service components associated with the second deployment. The apparatus is further caused to process and/or facilitate a processing of the first set to conform to the second set using at least one translation model. The apparatus is further caused to process the service request at the second deployment based, at least in part, on the conforming of the first set to the second set.

According to another embodiment, a computer-readable storage medium carries one or more sequences of one or more instructions which, when executed by one or more processors, cause, at least in part, an apparatus to receive a service request from a device. The device has migrated from a first deployment of a service to a second deployment of the service. The apparatus is also caused to determine a first set of one or more service components associated with the first deployment and a second set of one or more service components associated with the second deployment. The apparatus is further caused to process and/or facilitate a processing of the first set to conform to the second set using at least one translation model. The apparatus is further caused to process the service request at the second deployment based, at least in part, on the conforming of the first set to the second set.

According to another embodiment, an apparatus comprises means for receiving a service request from a device. The device has migrated from a first deployment of a service to a second deployment of the service. The apparatus also comprises means for determining a first set of one or more service components associated with the first deployment and a second set of one or more service components associated with the second deployment. The apparatus further comprises means for processing and/or facilitating a processing of the first set to conform to the second set using at least one translation model. The apparatus further comprises means for causing, at least in part, processing of the service request at the second deployment based, at least in part, on the conforming of the first set to the second set.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side, a proxy service in between or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing service mobility across service deployment boundaries are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are discussed with respect to deployments of a recommendation service, it is contemplated that the various embodiments are also applicable to any service that can be deployed in multiple instances or deployments. Furthermore, the various embodiments discuss context-based boundaries that use location as the context (e.g., provide for location-based boundaries of service deployments). However, it is also contemplated that any other context (e.g., time, activity, etc.) can be used to define boundaries between service deployments as discussed with respect to the various embodiments described herein.

Figure 1:
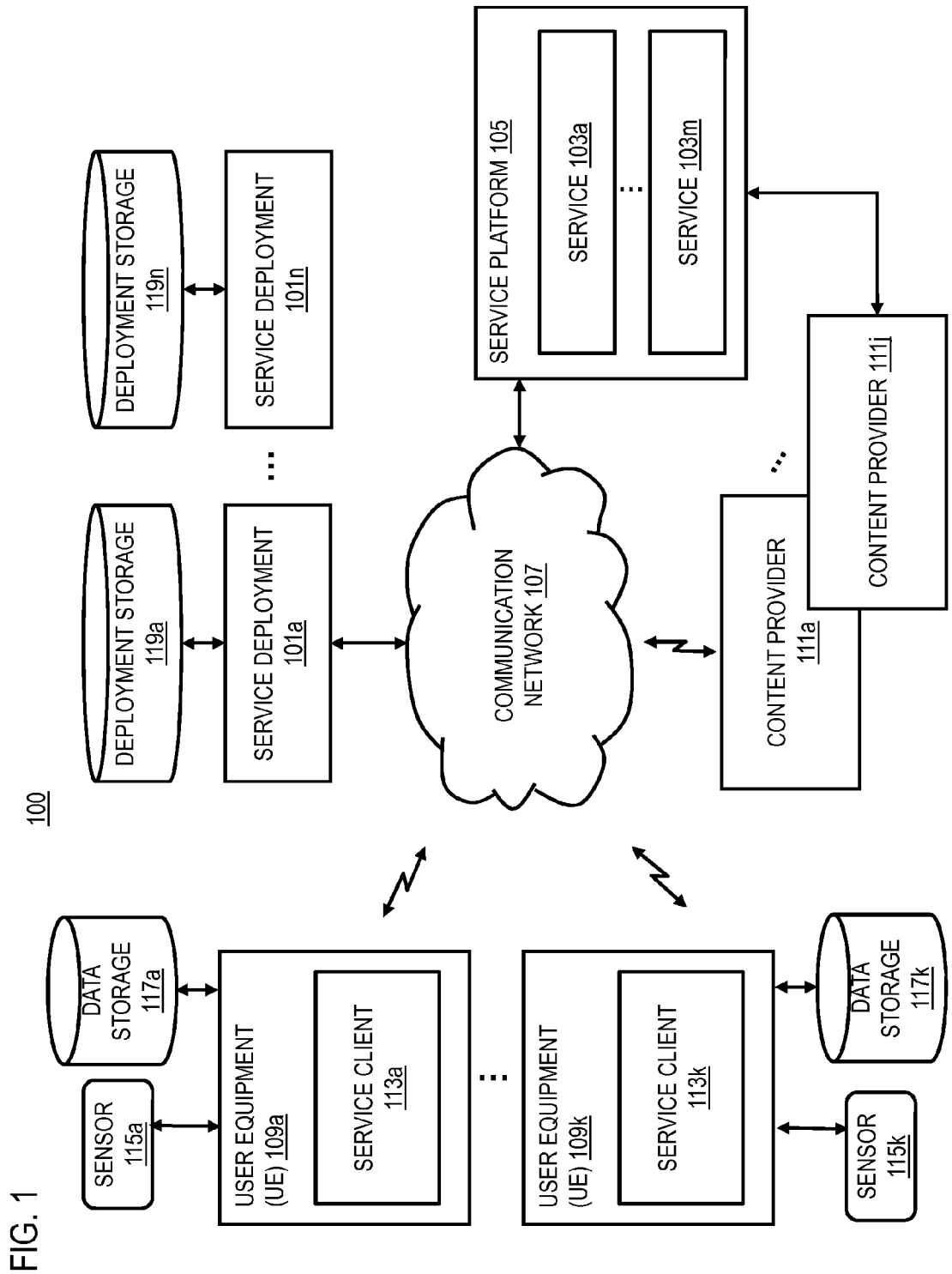
FIG. 1 is a diagram of a system capable of providing service mobility across service deployment boundaries, according to one embodiment.

FIG. 1 is a diagram of a system capable of providing context-based boundaries for service management, according to one embodiment. As network-based services become more sophisticated, service deployments also become increasingly complex. For example, services traditionally have been deployed based on a common software base that operates according to a single business model. In many cases, the data used between among such deployments are also the same. However, with the advent of a new generation of services, services can be deployed by independent service providers that can employ different business models, different modes of operations (e.g., for a recommendation service, different recommendation models may be used), different data sets. In this way, this new generation of services can be more flexible and configurable depending on the options selected by the service provider and/or the contexts (e.g., locations, times, activities, etc.) under which the service deployments operate. Thus, the same technology can be used by a service deployment but working with different data sets, different business models and service administration models.

By way of example, in many cases, a single entity is in command of global deployments for many state-of-the-art services. Additionally, a single business model is usually employed, but data can vary by region. It is also usually the case that the single entity also controls and/or owns the data used in such deployments. However, for services (e.g., a recommendation service) where quick and flexible deployment options are needed, the backend deployment must rely on an architecture that enables multiple entities to own, deploy, and/or employ different business models that are specific to their operating pattern for their particular deployment. In other cases, owning all data (e.g., a global data set of service) may be considered expensive and a license model is needed for third parties to provide data as well as control the service in certain licensed regions. Such entities may own the data that their service deployment would use. For example, a deployment instance of a recommendation service may own the data that the deployment would recommend to a user. The deployment of the recommendation service may also own the recommendation models or other service components used for delivering the service. For such license services, one requirement often is that the multiple deployments or licenses for the services typically are globally unique and region specific so that their area of coverage will not overlap or substantially overlap. At the same time, the multiple deployments generally have to interoperate to enable the mobility of users from one service deployment to another.

To address this problem, a system 100 of FIG. 1 introduces a capability to enable deployments (e.g., service deployments 101*a*-101*n*, also collectively referred to as service deployments 101) of one or more services (e.g., services 103*a*-103*m*, also collectively referred to as services 103, of the service platform 105) to different context-based boundaries (e.g., geographical boundaries) and enable the multiple service deployments 101 to work together to support one or more common data models while enabling implementation of different business, behavior, monetization, etc. models. In one embodiment, the system 100 enables multiple instances of service deployments to be coordinated by a central entity (e.g., the service platform 105 and/or the services 103).

In one sample use case of a recommendation service, a central entity (e.g., a service platform 105) manages the service deployments 101 over the communication network 107 to ensure that the service deployments 101 are at least substantially mutually exclusive and are geo-fenced (e.g., meaning that they operate within a geographic boundary without overlapping) or otherwise bounded by a another context (e.g., time-fenced, activity-fenced). In one embodiment, user mobility is allowed and managed between the context-based boundaries, and the recommendation models are also centrally managed allowing model inheritances. By way of example, the deployment framework of the system 100 is applicable to all services 103 and service deployments 101 where, for instance, no central entity can control all data, mobility management is used, multiple or different models (e.g., recommendation models) can be employed, and where key service technologies can be licensed to different service providers or data controllers.

For instance, in an example of a recommendation service with multiple service deployments 101, the service platform 105 (e.g., a central server of the recommendation service) and the associated service deployments 101 may employ any number and/or combination of recommendation technologies including, e.g., collaborative recommendation approaches and/or rule-logic (e.g., token) based systems. These recommendations technologies and models are discussed in more detail below. As noted above, the selection of one or more of the technologies or models can depend on, for instance, the selected business model, the types of content being recommended, context information, and the like. Moreover the recommendation models and/or the logic for applying the recommendations can come from a client, a server (e.g., the service platform 105, service deployments 101, etc.), or a hybrid (e.g., models or data about users are sent from the client, and the server provides the recommendation logic).

Accordingly, providing mobility and/or a certain degree of quality of service for users when they cross the boundaries from one service deployment 101 to another service deployment 101 is a significant technical challenge. For example, as previously noted, each service deployment 101 has the freedom to use their technology or service components of choice (e.g., to generate recommendations) as well as to rely on a global model (e.g., provided by a central server such as the service platform 105) to recommend content. By way of example, with respect to a recommendation service, some service deployments 101 may use a service component such as a collaborative recommendation model while other service deployments 101 may use market specific rule logic (e.g., token-based) recommendation models. In some embodiments, the system 100 enables client devices to directly provide their recommendation models, technologies, data, and the like, including tags or tokens that depict user context and/or preferences as well as latent vectors denoting user models.

In one embodiment, the recommendation and its service deployments 101 can also be tied to user accounts to facilitate mobility across deployments. For example, service components such as models, data, profile information, settings, preferences, etc. can be stored in user accounts which can be used to facilitate obtaining service from a new service deployment 101 that is at least substantially equivalent to service received from a home or previously used service deployment 101. Moreover, in some embodiments, the system 100 enables service mobility without manual user intervention. For example, the system 100 enables the service platform 105 and/or the service deployments 101 to translate or otherwise apply the service components (e.g., recommendation technologies, models, data, etc.) from one service deployment 101 (e.g., a home service deployment 101) to another service deployment 101 (e.g., a new service deployment 101).

As shown in FIG. 1, the system 100 comprises user equipment (UEs) 109a-109k having connectivity to the service platform 105 and the service deployments 101 via the communication network 107. In this description, the UEs 109a-109k may be collective referred as the UEs 109. The UEs 109 also have connectivity one or more content providers 111a-111j via the communication network 107. The UEs 109 may include respective service client applications 113a-113k (also collectively referred to as service clients 113), which communicate with the service platform 105, the services 103, and/or the service deployments 101 to access one or more functions for of the corresponding service 103.

For example, if the service 103 is a recommendation service, the service client 113 can access the service platform 105 and/or the service deployments 101 to retrieve information regarding recommendations (e.g., content or uniform resource locator (URL) recommendations). The service platform 105 and/or service deployments 101 may receive data from the service client 113 that may be considered for recommendations. In one embodiment, the recommendation service 103 may additionally or alternatively exist within the UEs 109. For example, the UEs 109 may include one or more recommendation models for generating at least some of the recommendations locally for content sourced externally or export locally sourced recommendation models to external service for recommendations at the UEs 109. The data provided to the service platform 105 and/or service deployments 101 may include data from the respective sensors 115a-115k (also collectively referred as sensors 115) associated with the UEs 109. By way of example, the sensors 115 may include a location sensor, a speed sensor, an audio sensor, brightness sensor, etc. The data storage 117a-117k (also collectively referred to as data storage 117) may be connected to the UEs 109 to store the data captured via the sensors 115 as well as any other types of data, models, rules, etc.

In one embodiment, the service platform 105 and/or the service deployments 101 then may determine the recommendation rules and/or models to apply based, at least in part, on various types of information associated with the UEs 109, the recommendation request, and the like. In one embodiment, if a UE 109 has crossed the boundaries from one service deployment 101 to another service deployment 101, the rules and/or models to apply may be based on account mapping between the two service deployments 101 (e.g., determining and/or translation service components associated with the user from between the two service deployments 101 and/or a central server such as the service platform 105). In another embodiment, the service deployments 101 may also be connected to respective deployment storage 119a-119n (also collectively referred to as deployment storage 119), which can store various types of data including the rules, models, updates, etc. including those specific the service deployments 101 or the those common the service 103 in general. The service platform 105 and/or the service deployments 101 may also retrieve or synchronize recommendation rules and/or models as well as updates for the rules and/or models from the services 103. In another embodiment, the rules and/or models and/or the updates may also exist in or provided by the one or more content providers 111.

In one embodiment, the service deployments 101 are registered with the service platform 105 and/or the service 103 for service management. More specifically, on registration, the service platform 105 provides license information or otherwise defines context-based boundaries under which the service deployments 101 operate. As discussed above, in one embodiment, the context-based boundaries can be determined so that the service deployments operate in substantially non-overlapping and/or exclusive context areas (e.g., geographical areas). The registration process may also include defining preferences, settings, etc. for translating service components across multiple independently operated service deployments 101.

Following registration, the service platform 105 can then route service requests from the service 103 to the appropriate service deployment 101 based, at least in part, on context-based boundaries. For example, the service platform 105 receives a service request directed to the service 103 and then determines context information (e.g., location, time, activity, etc.) associated with the requesting UE 109, service client 113, and/or corresponding user. The service platform 105 then routes the service request by, for instance, comparing the determined context information against the context-based boundaries of the service deployments 101 to determine the appropriate service deployment 101. For example, if the context-based boundary is a location-based boundary (e.g., a geo-fence), the service platform 105 determines location of the UE 109, service client 113, and/or corresponding user for matching against a map of the location-based boundaries.

In one embodiment, if the service request is directed to a recommendation service 103, the system 100 determines to retrieve the recommendation model from, for instance, a general collaborative model based on the user identifier and/or the application identifier. In one embodiment, for service clients 113 and/or UEs 109 crossing service deployment boundaries, the system 100 can translate and/or otherwise determine the appropriate recommendation technologies to apply depending on the technologies used within the originating service deployment 101 (e.g., home or previously used service deployment 101), and the new service deployment 101. For example, the system 101 may select different translation models (e.g., translating recommendation models based, at least in part, on their ontologies) depending on the specific technologies used in the related service deployment 101.

It is contemplated that the service platform 105 and/or the service deployments 101 may use any combination of one or more recommendation models, rules, settings, etc. to respond to the service request. As noted, the models, rules, etc. can be specific to a particular service deployment 101, generally applicable across one or more components of the corresponding service 103, or translated from one service deployment 101 to another service deployment 101.

By way of example, a pre-processing stage may take place to collect user data and to create a general collaborative model based on the collected data. For example, data about user interaction, user preferences, etc. may be collected from the UE 109, the service platform 105, the service deployments 101, and/or other devices, and then may be transferred to a server end (e.g., the service platform 105 and/or the service deployments 101). The server end may use the collected data to generate the collaborative model. For example, the collected data may include information about the user and the applications. Then, the collected data may be referred with the user identifier and/or the applications. In addition or alternatively, the collaborative model or other recommendation models (e.g., token-based models) may be generated and maintained at the UE 109. In this way, the UE 109 can generate recommendations locally or provide the models to the service platform 105 and/or the service deployments 101 as needed.

By way of example, there may be N users and M applications or M content types used by the users, and thus the general collaborative models (e.g., content recommendation collaborative models) may be generated for M applications or M content types. A collaborative filter applied to generate each collaborative model may be any other model generation approach taken from the state-of-the art. In one embodiment, the general collaborative model created at the server end may be N×M, with T number of latent factors used to factorize the model. The number of row N may vary depending on the number of the users. In this matrix, each row belongs to each of the N users, wherein each user is identified by a user identifier. Further, each model may also have its own identifier indicating the application domain for which that recommendation model was constructed.

If the general collaborative model already exists in the UE 109, then the service platform 105 and/or the service deployments 101 can retrieve the recommendation model from the general collaborative model within the UE 109. In one embodiment, this is subject to the condition that the collaborative model within the UE 109 conforms to the same items and rating types employed by the service platform 105 and/or the service deployments 101. In some embodiments, the system 100 enables translation of the collaborative models that do not conform to the same items or rating types using, for instance, one or more translation models (e.g., based, at least in part, on the ontologies of the collaborative models). In other embodiments, translation may not be needed if the ontologies are the same but some item ratings are missing. Here, user preferences for those missing items are predicted based on other user's ratings for whom there are significant rating similarities over some common items.

On the other hand, if there are no general collaborative models for the user within the UE 109, then the system 100 retrieves the recommendation model from the general collaborative model at the server end or other source available over the communication network 107 (e.g., external accounts and/or profiles associated with the user, such as cloud-based models or account information). Also, if the system 100 determines that, although there is a general collaborative model for the user within the UE 109, there is an updated version of the general collaborative model for the user at the server end or other network component, the system 100 may utilize the updated version of the general collaborative model at the server end to retrieve the recommendation model. A request to retrieve the recommendation model or the updated version from the server end may include the user identifier and/or the application identifier.

Further, in one embodiment, the system 100 may cause processing of the recommendation model and/or other recommendation models associated with a user identifier, to generate a user collaborative model at either the service platform 105 or the service deployments 101, wherein the processing of the recommendation model comprises a processing of the user collaborative model. In this case, the user collaborative model may be organized by the application identifier and/or other application identifiers. For example, in one embodiment, there are N×T matrix models for M number of applications corresponding to N number of users for each application and T number of latent factors used to factorize the models. Each 1×T matrix model can further be associated with at least one user identifier and corresponding user. In other words, the user identifier can be used to select or identify a particular user's 1×T matrices from among the N×T matrix. The system 100 can then retrieve the 1×T matrices corresponding to the user of the user identifier for M number of applications which have been modeled as a T×M matrix. In one embodiment, a distance product computation between the two matrices (e.g., a dot product of the 1×T and the T×M matrices) would give recommendations for each item within the M applications or content type. By way of example, these models and/or other recommendation models are stored and available for access by the service deployment 101, without the service deployment 101 having to retrieve them from the service platform 105 and/or the service 103.

Further, in one embodiment, the system 100 determines context information associated with a user and/or a device associated with the user that are associated with the user identifier, wherein the determination of the context-based recommendation rule and/or the processing of the context-based recommendation rule is based on the context information. The server end may include the context-based recommendation rule. There may be context-based recommendation rules corresponding to the user identifier, the context and the type of the context. Therefore, the context-based recommendation rule may be organized by a context and/or a context type. Further, the context information may include sensor data, user schedule, calendar, etc. The context-based recommendation rules may also depend on a type of the device. Also, the system 100 may also cause an initiation of the processing of the context-based recommendation rule based on a change to the context information. In this example, if the sensor 115 that is a location sensor indicates that the UE 109's location has been changed from the United States to the United Kingdom, then the processing of the context-based recommendation rule is initiated to utilize the context-based recommendation rule for the United Kingdom as provided by a corresponding service deployment 101 licensed to operated with the location-based boundary covering the United Kingdom.

By way of example, the communication network 107 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 109 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 109 can support any type of interface to the user (such as "wearable" circuitry, etc.).

By way of example, the UE 109, the service client 113, the service platform 105, and the service deployments 101 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the service clients 113 interact with the service 103, the service platform 105, and/or the service deployments 101 according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
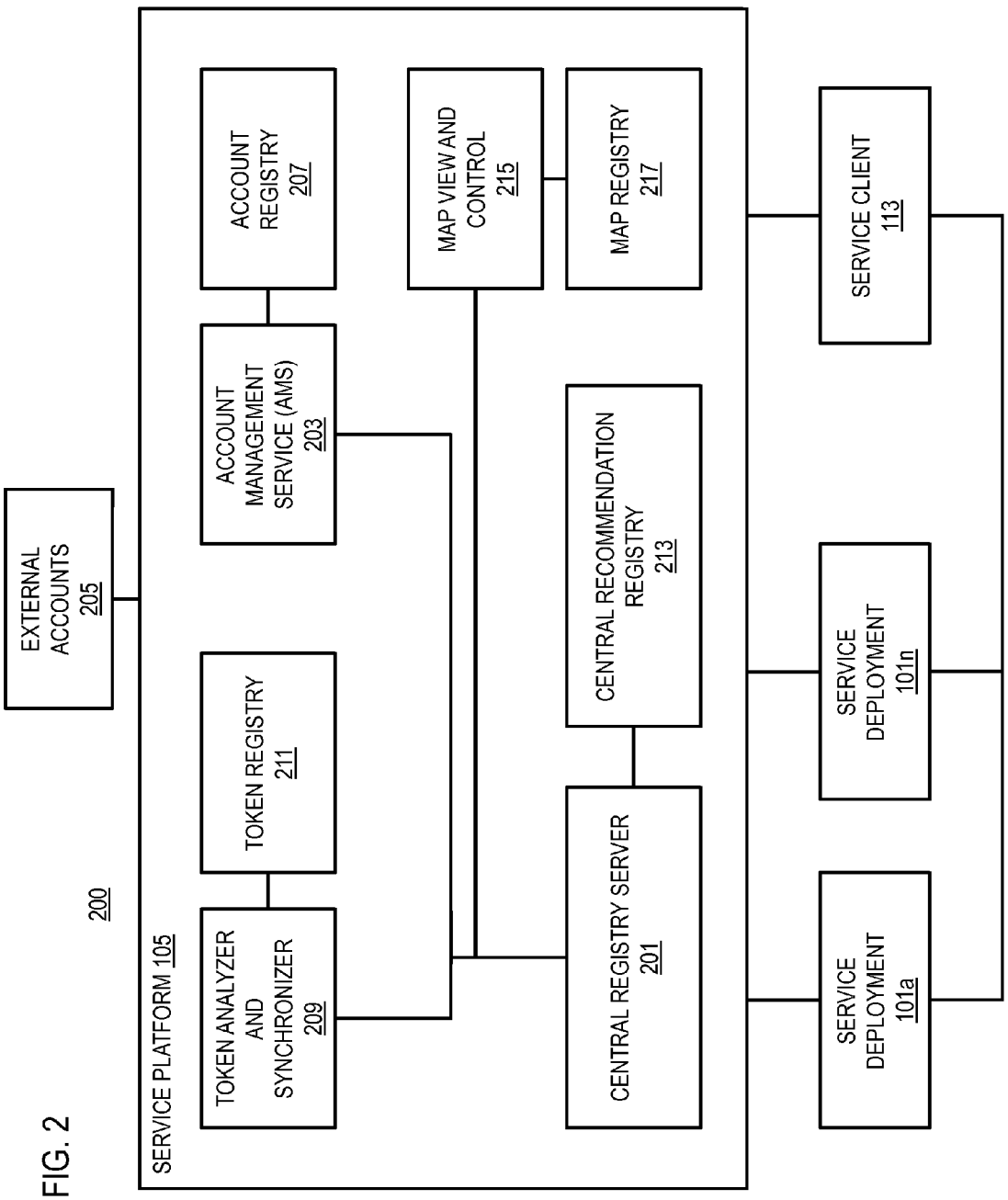
FIG. 2 is a diagram of the components of a service platform for providing service mobility across service deployment boundaries, according to one embodiment.

FIG. 2 is a diagram of the components of a service platform for providing service mobility across service deployment boundaries, according to one embodiment. By way of example, the service platform 105 includes one or more components for providing recommendations based on a recommendation model and a context-based rule. It is contemplated that the functions of these components may be combined in one or more components or performed by other components of equivalent functionality (e.g., components associated with the service deployments 101 and/or the service 103). In this example, the service platform 105 includes components for supporting general services 103 as well as supporting a recommendation service.

As shown in FIG. 2, the service platform 105 includes a central registry server 201 for registering one or more service deployments 101. In one embodiment, the central registry server 201 manages the designation and/or synchronization of context-based boundaries assigned to a registered service deployment 101. More specifically, the central registry server 201 ensures that service deployments 101 comply with predetermined criteria set by, for instance, the corresponding service 103. By way of example, these criteria may define the type of context-based boundaries (e.g., location-based boundaries such as geo-fences, time-based boundaries, activity-based boundaries, and/or any other context-based boundaries) and the licensing characteristics (e.g., exclusivity to a particular area or context, deployment area size, allowable overlaps, etc.).

For example, in one use case, installation of a service deployment 101 may include specifying and/or hard coding of the address or URL of the central registry server 201. In this way, as the service deployment 101 (e.g., a server associated with the service deployment 101) comes online, the service deployment 101 is directed to the central registry server 201 to complete the registration process. In one embodiment, an administrator or the service provider associated with the service deployment 101 can complete the registration process by providing information such as: (1) a URL or Internet Protocol (IP) address for the service deployment 101; (2) central coordinates for the service area and/or region for the service deployment 101; (2) a radius of the service area of the service deployment 101 to indicate the area where the deployment is made; (3) authentication model for users of the service deployment 101; (4) fall back option service for using external user accounts (e.g., Nokia managed accounts); (5) preferred URL routing for service breakages; and (6) centralized account mapping to coordinate user credentials across multiple services 103 and/or service deployments 101 including billing and managing user information (e.g., recommendation models) when crossing context-based boundaries from one service deployment 101 to another service deployment 101. The list of registration items is provided to illustrate types of information that may be requested and is not intended to limit and/or prescribed specific information items. Depending on the service 103 that is deployed, it is contemplated that the registration items may be include only some or none of the listed items and/or other items not listed.

For example, with respect to deployment of a recommendation service, the registration items can also include information on the types of recommendation models used, associated ontologies (e.g., for identifying items included in collaborative models), lists of tokens or collections of tokens (e.g., token or content channels), context models or tokens (e.g., time interval models), and the like. In addition, the registration information may include configuration information related to the recommendation models or service components. In one embodiment, the configuration or settings may relate to, for instance: (a) synchronization settings, (b) language, (c) support for obtaining models or service components from the service client 113 and/or the UEs 109, and the like.

In one embodiment, the service platform 105 also includes an account management service (AMS) 203 that stores one or more accounts for the service deployments 101, the service 103, and/or the service platform 105 that are associated with the same user. In some embodiments, the account information may also be retrieved from one or more external account sources (e.g., the external accounts 205). The AMS 203 can then store the user account information in the account registry 207. By way of example, the account registry 207 acts as a look up table that can provide seamless user migration between different service accounts for the same user associated with, for instance, different context-boundaries (e.g., different regions) and/or different service deployments 101. In one embodiment, the AMS 203 can also restrict use of certain accounts to the corresponding context or region. In this way, the account information may also be geo-fenced or otherwise context-limited.

An example of information maintained in the account registry 207 is provided below as Table 1 listing user account information and a Table 2 listing registered service deployments corresponding to the account listed in Table 1.

TABLE 1

| Service ID | Service Name | User Name | User Password |
|---|---|---|---|
| 11111 | Deployment1-US | User1-US | Password1-US |
| 112122 | Deployment2-UK | User1-UK | Password1-UK |
| 113326 | Deployment3-India | User1-India | Password1-India |

TABLE 2

| Service ID | Service Name | URL |
|---|---|---|
| 11111 | Deployment1-US | http://www.deployment1US.com |
| 112122 | Deployment2-UK | http://www.deployment1UK.com |
| 113326 | Deployment3-India | http://www.deployment1India.com |

In the example of Table, a user (e.g., User 1) has established accounts for three service deployments 101 (e.g., Deployment1-US, Deployment2-UK, and Deployment3-India) of the same service 103, wherein each of the service deployments 101 geo-fenced or have context-based boundaries to a particular country (e.g., the United State, the United Kingdom, and India). Table 1 also includes the corresponding user account information (e.g. user name and password) for accessing each deployment 101. Table 2 lists the deployments 101 and provides an associated address or URL for accessing each deployment 101.

In some embodiments, the AMS 203 can define and store additional tables to list, for instance, meta content for the listed services. In addition or alternatively, the additional tables can be part of or created by the central registry server 201. For example, with respect to a recommendation service, the meta content or information can contain information about recommendation models used, translation of the recommendation models, user profile information, management URLs, billing, and URL routing information.

As noted above, in this example, the service platform 105 includes one or more components specific to a recommendation service. It is contemplated that the service platform 105 may include other components specific to other services 103 depending on the configuration and implementation. In this case, the service platform 105 includes a token analyzer and synchronizer 209. Although, the token analyzer and synchronizer 209 is specific to a recommendation service, another module of similar functionality can be substituted to use similar protocols and processes for synchronizing any kind of common data that shared between a service 103 and its corresponding service deployments 101. In this example, token analyzer and synchronizer 209 receives tokens for indexing web pages to provide recommendations. In one embodiment, the tokens can be generated by respective web analyzers (e.g., or local instances of the token analyzer and synchronizer 209) executing in the various service deployments 101. More specifically, URL data that is provided to the system 100 for analysis goes through the web analyzers which extract key tokens out of the web page. The web analyzers then check the extracted tokens against local indices to determine if the tokens already exist in the system. If they not exist, the tokens are added and then transmitted from the service deployments 101 to the token analyzer and synchronizer 209 for storage in a token registry 211.

In one embodiment, the token analyzer and synchronizer 209 and the token registry 211 maintain a global set of tokens that are segregated based, at least in part, on languages (e.g., localized tokens) so that service deployments 101 can synchronize with this repository for having up to date set of tokens. In this way, the token analyzer and synchronizer 209 provides for a powerful local indexing database while enabling the maintenance of a complete global set of tokens at the token registry 211 including tokens associated with multiple languages, regions, context-based boundaries, etc. With respect to other service types than recommendation services, the token analyzer and synchronizer 209 and the token registry 211 can form the basis for a general indexing repository. In one embodiment, the service deployments 101 include mechanisms to synchronize from the central token registry 211 as well as to add new tokens that are analyzed from new content in the local service deployment 101.

In one embodiment, the global set of tokens represents a global token model that is a sub-component within the service platform 105 to manage token lists for generating recommendations. By way of example, the global token model contains token entries for:

Location specific model tokens: a hierarchically maintained (in concept) list of tokens applicable for locations;
Language specific tokens: list of tokens supplied either hierarchically based on location or translation for standard tokens;
Language specific tokens: simple list of tokens specific to a language that can be used for indexing or for generating context-indexed token lists or rules
Time-based token models;
Context-token models; and
User profile tokens—extracted through, for instance, the AMS 203 or other account service.

In addition, a service platform 105 supporting a recommendation service may also include a central recommendation registry 213. In one embodiment, the central recommendation registry 213 is a separate component that is used for managing recommendation models including hierarchical management, inheritance, and hybrid mode support as described in more detail below. In one embodiment, the service deployments 101 associated with a recommendation service can register recommendation modes and models to the central recommendation registry 213 for mobile recommendation management. In embodiment, the central recommendation registry 213 enables management of one or more global collaborative models. For example, the global collaborative model contains:

Generic collaborative models where each model is tied to an ontology describing items for which the models are relevant.
Location specific collaborative models where each location can have a collaborative model and where queries arising within this location are given priority to this model. The model can be shared to services operating within the area and communication is generally bidirectional subject to agreements.
User specific collaborative models that may be tied to user accounts and generally accessible through a verification and authentication system. In one embodiment, the user specific models may be accessed by account mapping between service deployments 101.

In one embodiment, the central registry server 201 also mediates control and management messages between the central registry server 201 and each service deployment 101, and between the service deployments 101. By way of example, the central registry server 201 provides a unique URL that exposes secure RESTful services to which the service deployments 101 can submit registry messages and manage transactions of control messages. In one embodiment, each control and management message is a hypertext transport protocol (HTTP) message transaction. It is also contemplated that other protocols that perform similar functions may also be used.

By way of example, as part of the deployment registration process, messages can be exchanged for submitting any combination of the following parameters to register a new instance of a service deployment 101 (the messages and/or parameters discussed below are for illustration and are not meant to define or limit the types of messages that are exchanged as part of the service management across service deployments; also one or more of the messages or parameters can be substituted depending on the service 103 being deployed):

Registration or license key;
Central location coordinate in latitude and longitude;
Radius of service (a specific embodiment may use the license key and radius to create a hash key for all exchanges);
Service deployment URL (URL to which clients in that region can connect);
Optional management URL (this is usually provided by the installation package and is relative to the service deployment URL);
Enable/disable account mapping;
Recommendation model employed;
Service URL re-route: default is registry server URL—for breakages to service;
User account needed/not needed;
Fence-crosser user: service user account needed/not needed; and/or
Fence-crosser user: user account needed/not needed (e.g., central token management supported).

The central registry server 201 can then respond with messages to indicate one or more of the following:

OK—all submitted parameters are okay and registration has been completed;

New map view URL if needed, otherwise this would be a standard URL provided in the installation package;

Reduced Radius—given radius does not match license or duplicate may exist;

Deployment rejected—invalid license key, duplicate entry or deployment for that area exists; and/or Recommender registry URL: This is specifically sent by the server indicating a change in configuration, otherwise the standard URL is provided with the installation package for the service deployment 101.

Following registration, the central registry server 201 and the service deployments 101 may exchange additional information messages related to service management. For example, the service deployments 101 may transmit any one or more of the following messages to the central registry server 201:

Service down: provides optional re-route URL or default URL (registry URL) or re-route URL provided during registration process;

Invalid user account—for fence or boundary crossers;

User profile request with Nokia Token or global account identifying tokens—access to profile information of user provided a valid token is given by client;

Invalid user account submission—by fence or boundary crosser user; and/or

Synchronize Token Index—parameters localization data—for synchronizing tokens for indexing from central repository on server.

Similarly, the central registry server 201 can transmit any one or more of the following management messages to the service deployments 101:

Invalid token: not issued token or session expired token in response to request for user profile access with Nokia token or other global account management process;

Change of registry URL;

Change of Recommendation Registry URL;

Radius overlap message (if new deployment overlaps in radius within a set threshold, a message is sent to all affected deployments); and/or Synchronize token index—from web analyzer output in each installations.

In another embodiment, the central registry server 201 and the service deployments 101 may exchange additional query and control messages related to providing service mobility across service boundaries. By way of example, the messages that are sent are dependent on the recommendation model employed by the particular service deployment 101. In the example of a recommendation service, the associated service deployments 101 support both token-based (e.g., rule-based) and collaborative-based recommendations. It is also contemplated that any other recommendation technology and/or models may be used in the various embodiments described herein. In one embodiment, the types of recommendation technologies to use can be encoded in the license information or key associated with the service deployments 101. In such a case, the messages can contain information that identifies the service provider (e.g., via secure messages) that would be subject to a resource identification check through a license management module of the service platform 105. In one embodiment, the messages are control messages based on RESTful messages. In addition or alternatively, any control channel such as XMPP, SIP/SOAP, etc. can be used to convey the control messages.

In one embodiment, control messages between the central registry server 201 and the service deployments 101 for managing token-based recommendations include, at least in part, any one or more of the following:

Channel definition tags //Get the list of tags for each channel definition provided;

Channel updates //Get updates to channel definitions;

New channel updates //Get new channel definitions;

Time interval model //list of all time interval models: intervals between hours—24 hr format;

Time interval tag definitions //Get updates for tag definitions for time intervals;

Context type support: //Get new context definitions in accordance with device enhancements;

Context type token definition: //Get definitions for each context type;

Get user recommendation //provide Nokia account token, context data;

Register location token provider;

Location-based tag updates to global model; and

Get recommendation preference token for particular user //from central server to home server.

In one embodiment, tokens can be specified for content channels that are defined through a set of tags that is provided either through machine-based research, directly provided by a service provider or other vendor as well as provided through collaborative user input. By way of example, the channel definition tags or tokens are sourced from the central registry server 201 by the service deployment 101. In cases where new channels are made within the service deployment 101, the service deployment 101 may also export the channel names, tags, or tokens to the central registry server 201. The central registry server 201 may then make comparisons of tags or tokens with existing definitions and can either add a new entry for the definition of the channel or provide a mapping from a definition specified at the service deployment 101 to something that already exists on the central registry server 201. In another embodiment, channel updates provide updates to existing channels while new channels can be queried based on settings configured on the service deployment 101.

In one embodiment, the channel recommendations are specified with respect to context information such as a time-interval. For example, the default time interval may be 2 hrs and each time interval may be defined with tags or tokens of the corresponding channel. These tags define, for instance, what to recommend in these time intervals. In one embodiment, there can be several time intervals defined and separate tag sets depending on the granularity of interval. In addition the channel may be defined with respect to any other context type such as location, activity, etc. In this way, the context types and/or any combination of the context-type can have tag or token definitions on their own. In one embodiment, the location token provider is an authorized entity on behalf of a service provider capable of adding location tokens at any level of granularity in a hierarchically maintained location database. In some embodiments, the location token provider can be the service provider or service deployment 101 itself.

In one embodiment, control messages between the central registry server 201 and the service deployments 101 for managing collaborative-based recommendations include, at least in part, any one or more of the following:

Assign model token //for global model described in later section;

Synchronize model //provide tokens as parameter;

SUBMIT data log //data logs of users;

Client model provision update //update if client model provisioning support has been updated;

SUBMIT log ontology update;

Get User recommendation //By providing Nokia account token, optional context data;
Query user model //By providing Nokia account token—ask for a particular user model;
Query user model with location;
Update user model with location; and
Get user latent vector from home service //queried by central server.

In one embodiment, the assign model token request (listed above) is sent by the service deployment 101 and/or associated service provider. By way of example, the request will create a token reference to user model entries in the collaborative model. In one embodiment, the token is stored in a service token registry in the central registry server 201 and also sent back to requesting service deployment 101 by the central registry server 101. The service deployment 101 can then use this token (not mandatory as the central registry server 201 can also look up the token but can be used as additional authentication) in subsequent model based requests to the central registry server 201.

In addition, the data logs submit (listed above) is a submission of data logs (activity logs and rating logs) of users who used the service deployment 101. The central registry server 201 can use the data logs to rebuild the model for collaborative recommendation if needed. In some embodiments, the service deployment 101 can use the GET User Recommendation message to get a recommendation for a particular user from the central registry server 201 if the service deployment 101 itself is not able to provide recommendation. For example, this is prevalent when mobility management comes to place as well as a fallback option for service reliability.

In one embodiment, the central registry server 201 may use a general profile to provide recommendations if the specific profile for the user is not accessible. In some embodiments, it is assumed that some sort of user identification (such as an account session token) is provided to authenticate access to user models. Accordingly, the query user model message (listed above) will return the vector of collaborative model corresponding to a particular user.

In another embodiment, the query model with location (listed above) provides a location specific collaborative model that may be different from standard user models. The service has the option to query this instead of the standard model. In yet another embodiment, the update user model message (listed above) with location provides location information for associating with the collaborative models stored at the central registry server 201. Finally, in one embodiment, if the collaborative models are not available at the central registry server 201, the central registry server 201 can use the get user latent vector from home service message (listed above) to request the model or information for generating the model from the home service deployment 101 associated with the user.

Following completion of the registration of the service deployments 101, the central registry server 201 can also manage the routing process for service requests directed to the deployed service 103 from one or more service clients 113. For example, a UE 109 and associated service client 113 may move from one context-based boundary or region to another. In this case, the service client 113 may send a service request (e.g., an HTTP GET request) to either (1) a home base URL corresponding to a service deployment 101 registered for that service client 113 (e.g., during client installation or during a settings change); (2) the central registry server 201 where service requests will be serviced and/or routed to other service deployments 101; and/or (3) the URL of the service deployment 101 in the route information provided by the central registry server 201 in response to the first service request (e.g., a GET request) to the central registry server 201.

More specifically, the central registry server 201 can respond to service requests with a message (e.g., an extensible markup language (XML) body with the HTTP 200 OK message) that may contain a list of service URLs that can be interpreted by the service client 113 to perform actions in a certain way (e.g., depending on settings on the service client 113 and how the client logic has been programmed) to access the appropriate service deployment 101. An example implementation may enable users to choose whether to use a home base URL (e.g., corresponding to a home base service deployment 101) or the service deployment 101 operating with the context-based boundary (e.g., geo-fence) in which the service client 113 is currently located. In some embodiments, the costs associated with accessing one service deployment 101 versus another service deployment 101 may differ and can factor in the service client 113's decision to select one service deployment 101 over another service deployment 101.

In the case of a service client 113 crossing a boundary from its home region to another region, the service client 113 can transmit a message to the service deployment 101 of the new region to provide one or more parameters to initiate communications and/or service with the new service deployment 101. In one embodiment, the service parameters can be provided to the service client 113 by the central registry server 201, and may include, for example: (1) a service authentication token—for accessing user profile information by the new service deployment 101; (2) a token for access to the data in the central recommendation registry 213); and/or (3) a new service URL corresponding to the new service deployment 101.

In one embodiment, when sending service requests to any service deployment 101 other than the home base service deployment 101, the service client can identify the home base service deployment 101 (e.g., via a home base URL) in the service requests. In this way, the new service deployment 101 can more efficiently identify data, models, etc. from the home base service deployment 101 to facilitate migration of the service client 113 from one context-based boundary to another.

As shown in FIG. 2, the service platform 105 also includes a map view and control module 215 which provides a visualization of the service deployment boundaries. Information associated with presenting the visualization can be stored in the map registry 217. For example, in the case of location-based boundaries or geo-fences, the map view and control module 215 provides an overview of the service deployments 101 and their respective boundaries that are visible within the display. The map view and control module 215 can also provide administrative tools for monitoring and/or managing the service deployments. For example, the map view and control module 215 can visualize service requests from active service clients 113, display fence or boundary crossing users, enable the specification of new boundaries, enable moving of service deployments 101, and the like. In one embodiment, the map view and control module 215 interacts with the central registry server 201 to determine and display updated service deployments 101 and boundaries. The map view and control tool can be used by administrators of any of the service deployments 101 to access and view deployments. In some embodiments, access to certain types of data could be controlled for the map view and control tool usage by the central registry server.

Figure 3A:
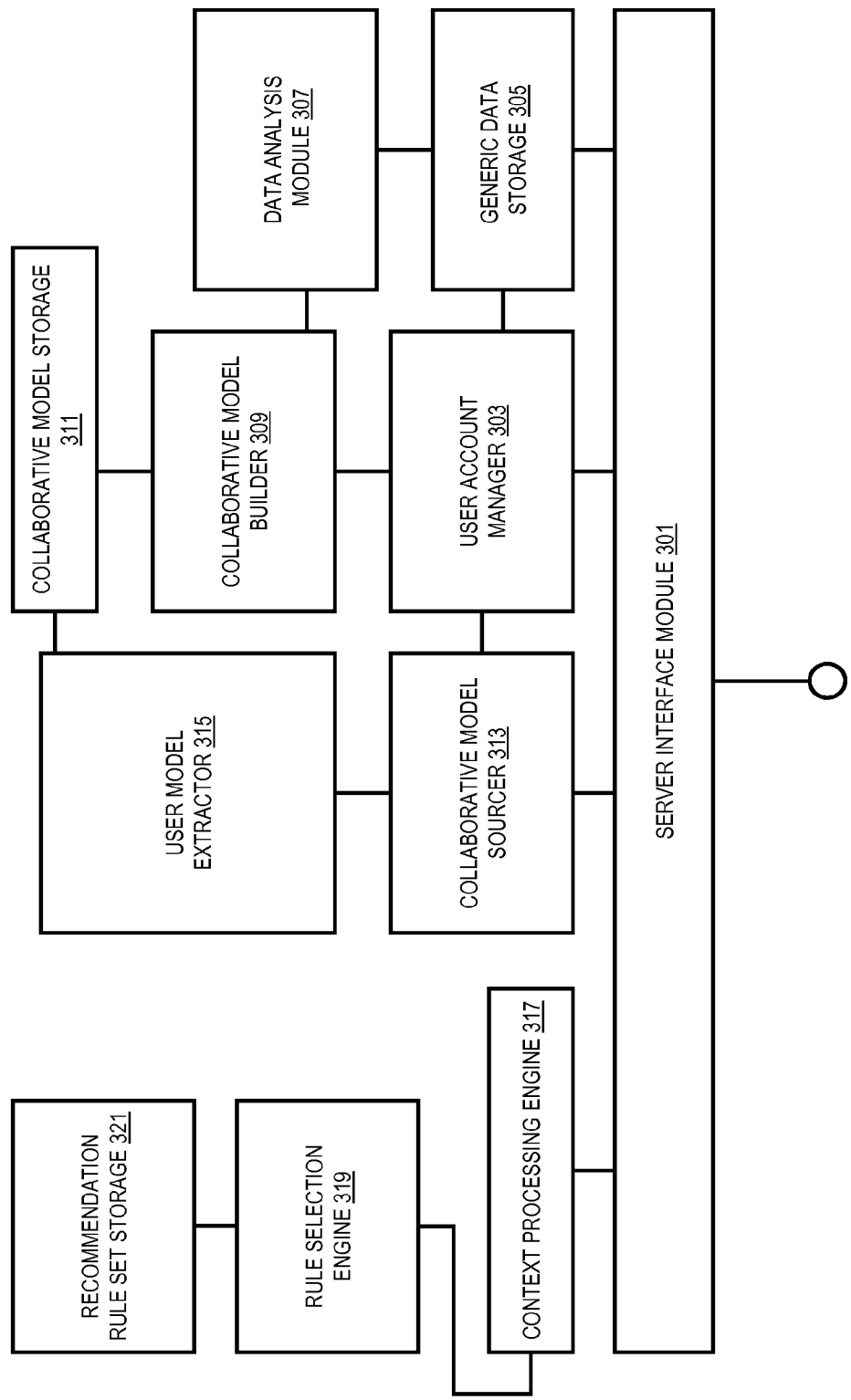
FIGS. 3A and 3B are diagrams of the components of a server end and a client end of a recommendation service, according to one embodiment.
Figure 3B:
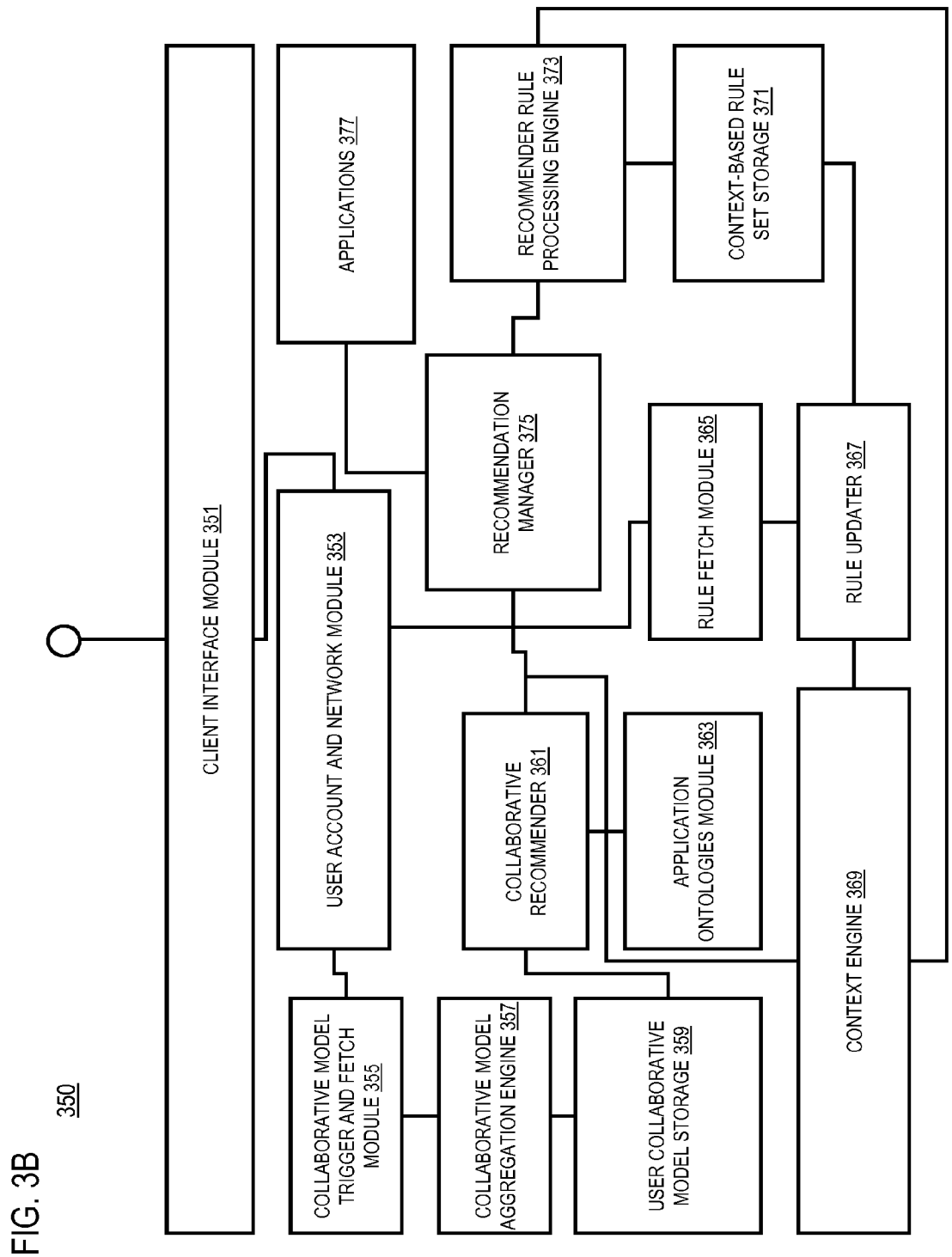

FIGS. 3A and 3B are diagrams of the components of a server end and a client end of a recommendation service, according to one embodiment. More specifically, FIGS. 3A and 3B illustrate components of a recommendation service that can be deployed as discussed with respect to the various embodiments described herein. FIG. 3A shows a diagram of the components of the server end. The server end may comprise the service 103, the service platform 105, and/or the service deployments 101. FIG. 3B shows a diagram of the components of a client end. The client end may include the service client 113. It is contemplated that all or a portion of the functions of the service end and/or client end may be performed by the service 103, the service platform 105, and/or the service deployment 101. It is further contemplated that the functions of these components may be combined in one or more components or performed by other components of equivalent functionality.

In the embodiment shown in FIG. 3, the server end 300 in FIG. 3A includes a server interface module 301, a user account manager 303, a generic storage 305, a data analysis module 307, a collaborative model builder 309, a collaborative model storage 311, collaborative model sourcer 313 and a user model extractor 315. The server end 300 also includes a context processing engine 317, a rule selection engine 319 and a recommendation rule set storage 321. The server end 300 may exist at the service platform 105 and/or the service deployments 101, in one embodiment. The server interface module 301 used to communicate with devices and/or services outside the server end 300. For example, the server interface module 301 may be used to send and receive signals, commands, requests, as well as data. The user account manager 303 may read a user identifier such that appropriate data can be processed based on the user identifier. The generic data storage 305 may be used to collect data received via the server interface module 301. For example, during a preprocessing stage, user data used to create a general collaborative model may be collected and stored at the generic data storage 305. The collected data may include data about user interaction, user preferences, etc. that can be collected from the UE 109, the service platform 105, the service deployments 101, and/or other devices. The data analysis module 307 may then retrieve this data from the generic data storage 305, and prepare the collected data to create a general collaborative model. The collaborative model builder 309 is used to create a general collaborative model based on the collected data received from the generic data storage 305. In one embodiment, the general collaborative model is a content recommendation collaborative model to support generating user recommendations for one or more services 103 and/or service deployments 101. For example, if there are N users and M content types associated with the one or more services 103, then M number of content recommendation collaborative models may be created. The general collaborative model and/or the one or more recommendation collaborative models may be stored at the collaborative model storage 311. In some embodiments, the general collaborative model and/or the one or more recommendation collaborative models may be extracted by the user model extractor 315, when the collaborative model sourcer 313 receives a request for the models.

In addition, the context processing engine 317 may be used to receive context data from a user device (e.g. UE 109), and/or a service 103 via the server interface module 301, and relay the context data to the rule selection engine 319. Then, the rule selection engine 319 may select an appropriate rule set based on the context data such that the selected rule may be used for the scenarios within the context. The rule selection engine 319 may select the rule from the recommendation rule sets 321. In one embodiment, the selected rule is sent to the client end 350 via the server interface module 301 so that the client end 350 can process, for instance, the recommendation locally based, at least in part, on the selected rule. In addition or alternatively, the server end 300 can generate a recommendation using, at least in part, the selected rule on the server side, and then transmit the recommendation to the client end. In one embodiment, applying the recommendation rules or models at the client end 350 enables the client end 350 to maintain the privacy of data processed using the recommendation rules. On the other hand, processing the recommendation at the server end 300 enables the system 100 to leverage the greater resources (e.g., processing resources, memory resources, data availability, etc.) of the server end 300 to efficiently generate recommendations.

Accordingly, the server end 300 may also have a recommendation rule set storage 321 used to store the recommendation rule sets. The context information used in the various embodiments described herein may include time, location, schedule, speed, user profile, sound, etc. Thus, there may be context-based recommendation rules for each context. The context processing engine 317 can read the context data received from the client end 350, and use the rule selection engine 319 to select an appropriate rule set for the received context. If the recommendation rule set is to be applied at the client end 350 (as described above), the context processing engine 317 then may be used to send the selected rule set to the client end 350 via the server interface module 301.

In FIG. 3B, the client 350 may include a client interface module 351, a user account and network module 353, a collaborative model trigger and fetch module 355, a collaborative model aggregation engine 357, a user collaborative model storage 359, a collaborative recommender 361, an application ontologies module 363. The client 350 may also include a rule fetch module 365, a rule updater 367, a context engine 369, a context-based rule set 371, a recommender rule processing engine 373, as well as a recommendation manager 375 and applications 377. The user account and network module 353 may receive a request for generating a recommendation, the request including a user identifier and/or an application identifier. By providing the user identifier and/or the application identifier in the request, the recommendation may be made specifically for the user and/or the application identified by the user identifier and/or the application identifier. Next, the recommendation manager 375 may be used to determine a recommendation model associated with the user identifier and/or the application identifier. The recommendation model may be retrieved from the general collaborative model based on the user identifier and/or the application identifier. As discussed previously, the general collaborative model may be created by the server end 300. Thus, the collaborative model trigger and fetch module 355 may be used to retrieve the recommendation model from the general collaborative model from the server end 300 via the user account and network module 353.

For example, for each application, a 1×T matrix model may be retrieved from one of the rows in the N×T matrix model in the general collaborative model, wherein the retrieved 1×T matrix model corresponds to the user identifier in the request for generating a recommendation. The collaborative model aggregation 357 designates the retrieved 1×T matrix as the user collaborative and stores this model in, for instance, the user collaborative model storage 359.

Then, the user collaborative model may be processed by the collaborative recommender 361 along with the application ontologies module 363 to generate recommendations. In one embodiment, the collaborative recommender 361 retrieves the 1×T matrix user collaborative model from the user collaborative model storage 359. The collaborative recommender 361 also retrieves a T×M matrix where an M number of applications are modeled with the latent factors T to process recommendations. The application ontologies module 363 then maps to the application identifiers identifying applications for the respective fields of the 1×T matrix user collaborative model. Then, the collaborative recommender 361 can choose an item in the T×M matrix based on the input from the recommendation manager 375. In one embodiment, the collaborative recommender 361 can chose the item by performing a distance product computation between the 1×T matrix user collaborative model and the T×M matrix of application items (e.g., a dot product of the 1×T and the T×M matrices). The recommendation manager 375 may control the recommendation process, and may make recommendations for the applications 377 and/or items of the applications 377 based on the user collaborative model. Thus, the recommendation may relate to selection of applications executing at a device and/or items within the applications.

After determining the recommendation model (e.g. user collaborative model), the recommendation manager 375 determines a context-based recommendation rule. The context data associated with the user and/or the device of the user may be collected at the client end 350, and then may be sent to the server end 300, such that the context processing engine 317 can return a recommendation rule set to the client end 350, as discussed previously. Then, the recommender rule processing engine 373 processes the rule sets to generate the context-based recommendations, such that the context-based recommendations may be used by the recommendation manager 375 for generating recommendations. The context-based recommendation rule may also be stored in the context-based rule set storage 371. Then, the context-based recommendation rule may be retrieved from the context-based rule set storage 371 by the recommendation manager 375 when generating recommendations. The rules may be updated based on the changes in the context, by the rule updater 367. For example, changes to the context may be detected by the context engine 369, and this change may cause the rule updater 367 to initiate processing the context-based recommendation rule based on this change in the context information. Then, the rule fetch module 365 may cause transmission of the changes to the context information to the server end 300 such that the server end 300 may provide an updated recommendation rule set based on the changes to the context information.

With the recommendation models and the context-based models, the recommendation manager 375 may process the recommendation model and/or the context-based recommendation rule (via the rule processing engine) for generating the recommendation. For example, when the changes in the context are detected, the recommendation manager 375 may request the recommender rule processing engine 373 for output tokens, which denote application input data (data that will be passed to an application for example to initialize it) and/or model selection data. The application input data may be fed to an appropriate application, whereas the model selection data may be used to select an appropriate model from the user collaborative model. The model selected from the user collaborative model may be combined with input data for applications to generate recommendations.

Figure 4:
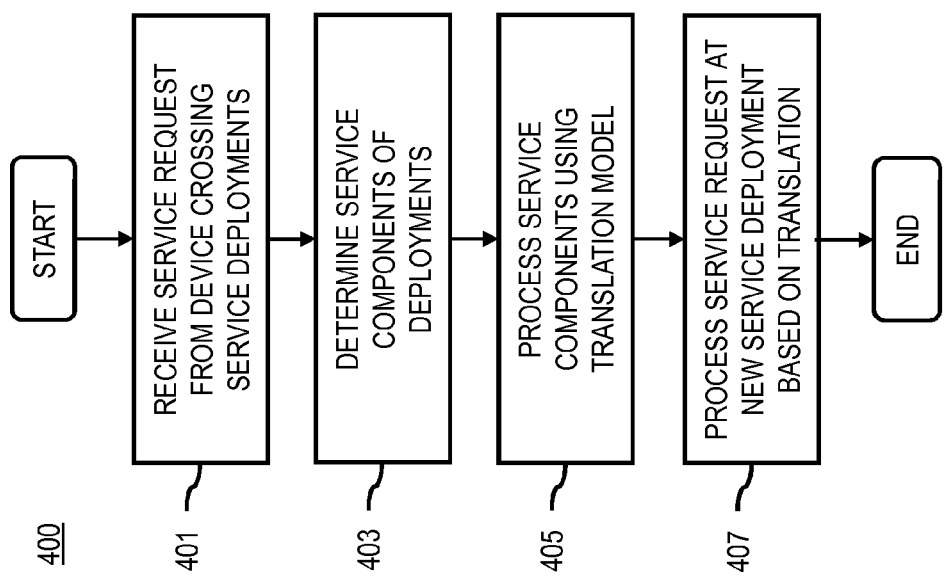
FIG. 4 is a flowchart of a process for providing service mobility across service deployment boundaries, according to one embodiment.
Figure 11:
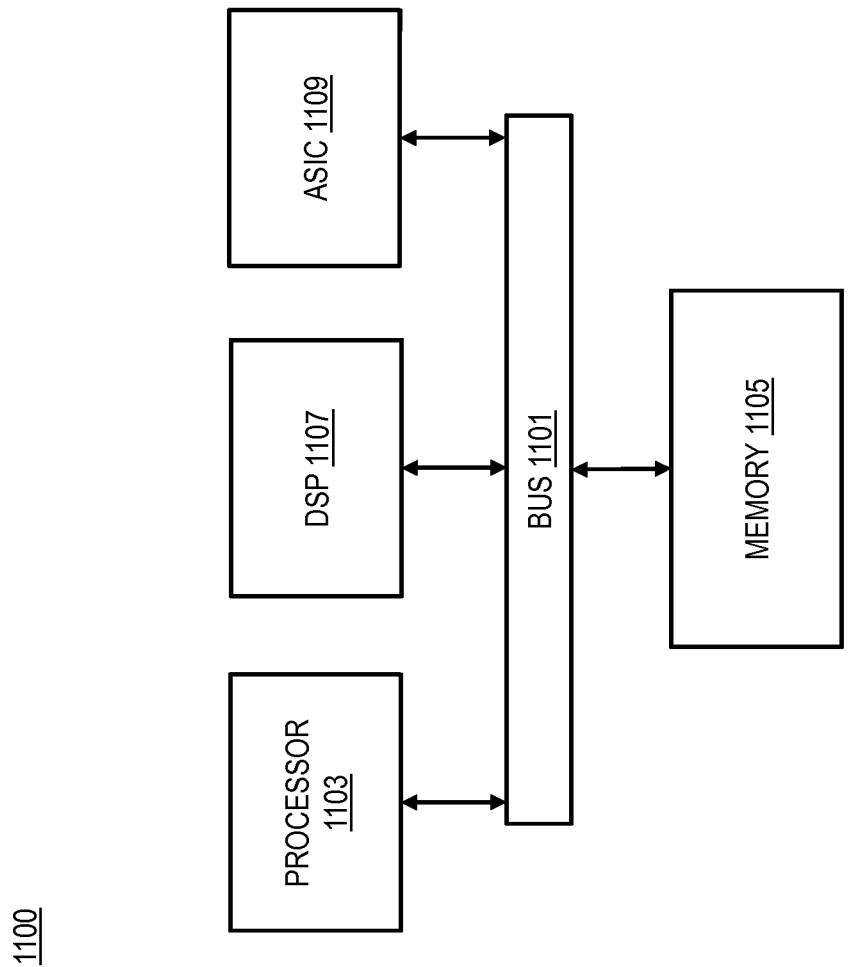
FIG. 11 is a diagram of a chip set that can be used to implement an embodiment of the invention.

FIG. 4 is a flowchart of a process for providing service mobility across service deployment boundaries, according to one embodiment. In one embodiment, the service platform 105 performs the process 400 and is implemented in, for instance, a chip set including a processor and a memory as shown in FIG. 11. In addition or alternatively, the service deployments 101 can perform all or a portion of the process 400.

In step 401, the service platform 105 (e.g., a central server) receives a service request from a device, wherein the device has migrated from a first deployment 101 of a service 103 to a second deployment 101 of the service 103. For example, the device (e.g., a UE 109) on moving across boundaries (e.g., geo-fences) gets a redirect message from the service platform 105 to, for instance, direct the device's service request from the old service deployment 101 to the new service deployment 101, or from the service platform 105 to the new service deployment 101.

Next, the service platform 105 determines a first set of one or more service components associated with the first deployment 101 and a second set of one or more service components associated with the second deployment 101 (step 403). For example, with respect to a recommendation service, the service components may include recommendation models, rules, data, context information, and/or other information for generating content recommendations. It is contemplated that the service components may include any modules, components, etc. to facilitate one or more functions or operations of the service 103. As previously discussed, the service components can differ between the two service deployments 101 because of different service options, business models, etc.

In step 405, the service platform 105 processes and/or facilitates a processing of the first set to conform to the second set using at least one translation model. In one embodiment, translating the first set of service components to conform to the second set includes converting data, models, rules, etc. associated with the first deployment 101 so that they can be processed or otherwise used at the second service deployment 101. For example, in the example of a recommendation service, translation includes conforming the models, rules, contexts, data, etc. of the recommendation technologies used in the first deployment 101 to make them usable or provide substantially equivalent performance at the second deployment 101. In some embodiments, where direct translation is not available (e.g., when recommendation models and/or other service components are not compatible), the translation provides for mapping to generic service components that can provide at least similar functions (e.g., using default models, rules, data, etc.) to approximate functions or operations of the first deployment 101 at the second deployment 101. The translation function as applied to a recommendation service is described in more detail with respect to FIGS. 5A-5D below.

Following translation, the service platform 105 causes, at least in part, processing of the service request at the second deployment 101 based, at least in part, on the conforming or translation of the first set to the second set (step 407). In addition or alternatively, the service platform 105 (e.g., a central server) can perform at least a portion of the processing of the service request and then transmit the results of the processing to the second deployment 101. For example, if the processing of the service request cannot be performed at the second deployment 101 (e.g., because one or more of the service components are not available or compatible with the second deployment 101), the service platform 105 perform the processing of the service request.

FIGS. 5A-5D are flowcharts of processes for translating components of a recommendation service across service deployment boundaries, according to various embodiments. More specifically, the examples of FIGS. 5A-5D depict processes for providing service mobility for a service client 113 that moves from a first service deployment 101 of a recommendation service (e.g., a home-base service deployment 101 to which the service client 113 is initially registered) to a new service deployment 101 of the recommendation service (e.g., the service deployment 101 under whose boundaries the service client 113 currently operates). In one embodiment, the service platform 105 performs the processes of FIGS. 5A-5D is implemented in, for instance, a chip set including a processor and a memory as shown in FIG. 11. In addition or alternatively, the service deployments 101 can perform all or a portion of the processes.

Figure 5A:
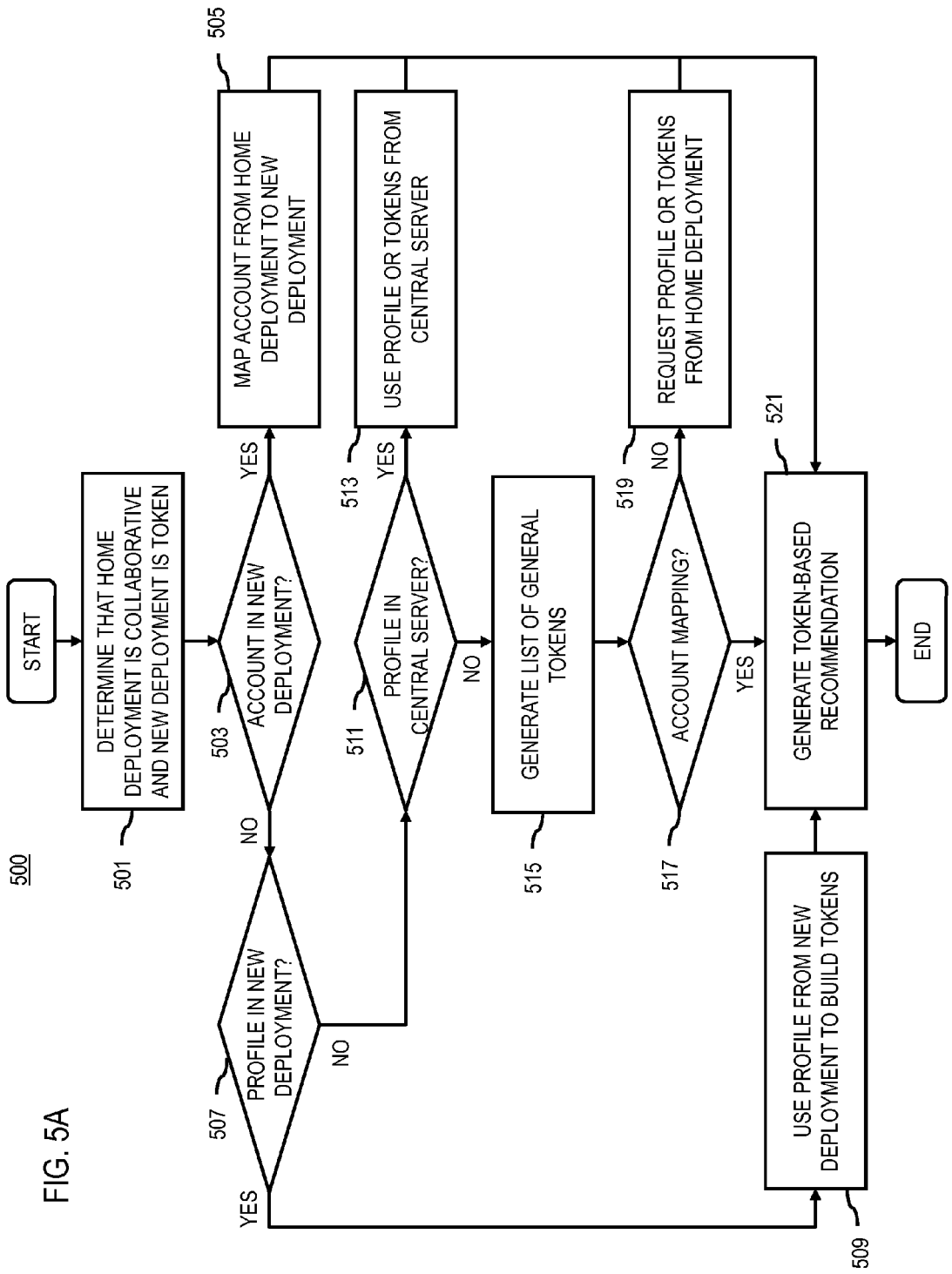
FIGS. 5A-5D are flowcharts of processes for translating components of a recommendation service across service deployment boundaries, according to various embodiments.

In step 501 of the process 500 of FIG. 5A, the service platform 105 determines that a first set service of components associated with the home service deployment 101 includes at least one collaborative recommendation model and that a second set of service components associated with the new service deployment 101 includes at least one token-based recommendation model. Next, the service platform 105 determines user account information, user profile information, or a combination thereof associated with the device (e.g., the UE 109) or service client 113, the first deployment 101 (e.g., the home deployment 101), the second deployment (e.g., the new deployment 101), a central server associated with the service (e.g., the service platform 105), or a combination thereof. The service platform 105 then processes and/or facilitates a processing of the user account information, the user profile information, or a combination thereof to determine one or more tokens for use with the at least one token-based recommendation model.

More specifically, if the user of the service client 113 hosts an account in the new service deployment 101 (step 503), then the service platform 105 uses, for instance, an account mapper service (e.g., the AMS 203) to map user account information provided in the home service deployment 101 to the new service deployment 101 (step 505). If there is no user account in the new service deployment 101, the service platform 105 determines whether there is profile information (e.g., user preferences, history, characteristics, etc.) in the new service deployment 101 (step 507).

If profile information exists, then the service platform 105 uses the profile information provided in the new service deployment 101 to build a token set for generating token-based or rule-based recommendations for the user of the service client 113 (step 509). If no profile information exists in the new service deployment 101, the service platform 105 (e.g., the central server) is checked for profile tokens or information associated with the user or service client 113 (step 511). If the service platform 105 has the profile tokens or information, then the service platform 105 uses the profile tokens or builds the tokens from the profile information for generating recommendations (step 513). If no profile information is available at the service platform 105, the service platform 105 can generate a list of general tokens for making recommendations (step 515). In one embodiment, the general tokens can be replaced as profile information about the user of the service client 113 is gathered.

If account mapping to the new service deployment 101 cannot be performed (step 517), then the service platform 105 can request the user profile information and/or user preference tokens from the home service deployment 101 (step 519). In one embodiment, the home service deployment 101 can then send the requested tokens for the user. If profile information is sent, the service platform 105 can convert the profile information into profile and/or preference tokens for generating recommendations. However, if tokens or profile information cannot be provided by the home service deployment 101, the service platform 105 queries the home deployment 101 for the user profile vector from the collaborative model. In one embodiment, the user profile vector can then be converted to explicit tokens by identifying with the item matrix for generating recommendations. If no information can be obtained, then the service platform can use a generic user profile to generate profile or preference tokens. The service platform 105 then uses the tokens generated in the processes described above to make token-based recommendations at the new service deployment 101 or on behalf of the new service deployment 101 (step 521).

Figure 5B:
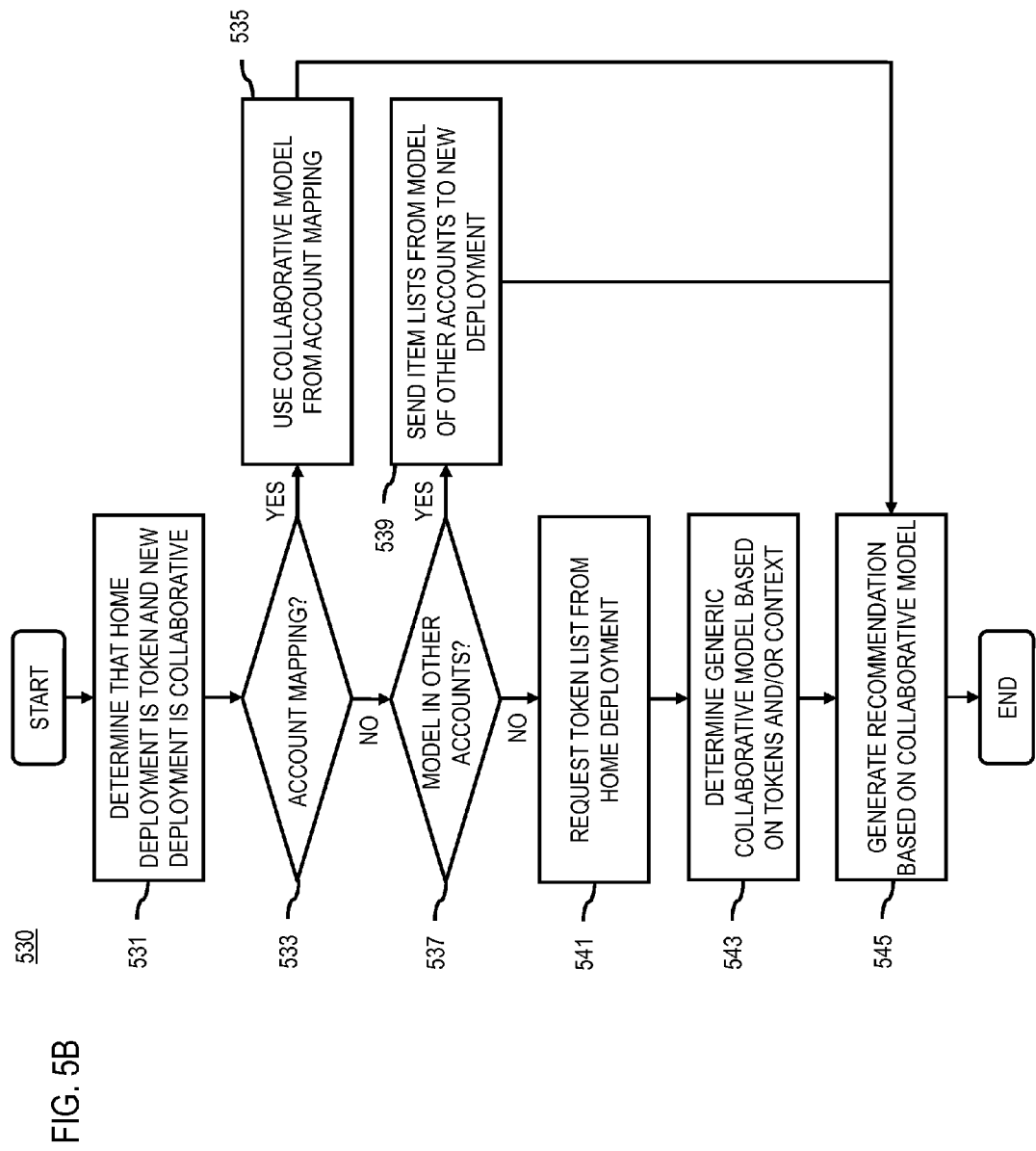

With respect to FIG. 5B, in step 531 of the process 530, the service platform 105 determines that a first set of service components associated with the home service deployment 101 includes at least one token-based recommendation model and that a second set of service components associated with the new service deployment 101 includes at least one collaborative recommendation model. Next, the service platform 105 determines user account information, user profile information, or a combination thereof associated with the device (e.g., the UE 109) or service client 113, the first deployment 101 (e.g., the home deployment 101), the second deployment (e.g., the new deployment 101), a central server associated with the service (e.g., the service platform 105), or a combination thereof. The service platform 105 then processes and/or facilitates a processing of the user account information, the user profile information, or a combination thereof to determine at least one user collaborative model for use with the at least one collaborative recommendation model.

In one embodiment, the service platform 105 processes and/or facilitates a processing of the one or more user tokens from the at least one token-based recommendation model for comparison against one or more other tokens associated with the one or more other collaborative models determine from, for instance, other services, accounts, etc. that are associated with the user or other similar users. For example, the one or more tokens associated with the collaborative model may represent items and/or characteristics of the items include in the collaborative models. In one embodiment, the system 100 can then compare the tokens from the token-based recommendation model against the tokens/items derived from the one or more other collaborative models to determine which collaborative model best matches. The service platform 105 then selects the at least one collaborative model (e.g., the collaborative model to use for generating recommendations in the new service deployment 101) from among the one or more other collaborative models based, at least in part, on the comparison.

More specifically, if user account mapping is available between the home service deployment 101 and the new service deployment 101 (step 533), the service platform 105 can use the collaborative model resulting from the account mapping to make recommendations with respect to the new service deployment 101 (step 535). Otherwise, the service platform 105 checks other accounts (e.g., external service accounts or other generic accounts) to determine if a collaborative mode exists for the user of the service client 113 (step 537). If such a collaborative model exists, the service platform 105 determines and then sends the item list (e.g., names or tokens depending on the application) associated with the collaborative model to the new service deployment 101 for generating recommendations (step 539).

If no collaborative model exists in other accounts, the service platform 105 requests a recommendation profile, preference, and/or context token lists associated with the user from the home service deployment 101 (step 541). Based, at least in part, on the token lists received, the service platform 105 can perform a user comparison against tokens associated with existing user collaborative models (e.g., models already available in the service platform 105 and for which collaborative model to token translations have been done). In one embodiment, the service platform 105 can select the best matching collaborative model and/or a user profile vector for use in generating recommendations at the new service deployment 101 (step 543). In another embodiment, if location or other context information of the service client 113 is provided or available, the service platform 105 can consult or retrieve context-based collaborative models for generating the recommendations. If no information or collaborative models is available in the home service deployment 101, the new service deployment 101, and/or the service platform 105, the service platform 105 can use context data (e.g., location, time, activity, etc.) for selecting a collaborative model or otherwise generating recommendations at the new service deployment 101. The service platform 105 then uses the collaborative model or models obtained via the processes described above to make collaborative recommendations at the new service deployment 101 or on behalf of the new service deployment 101 (step 545).

Figure 5C:
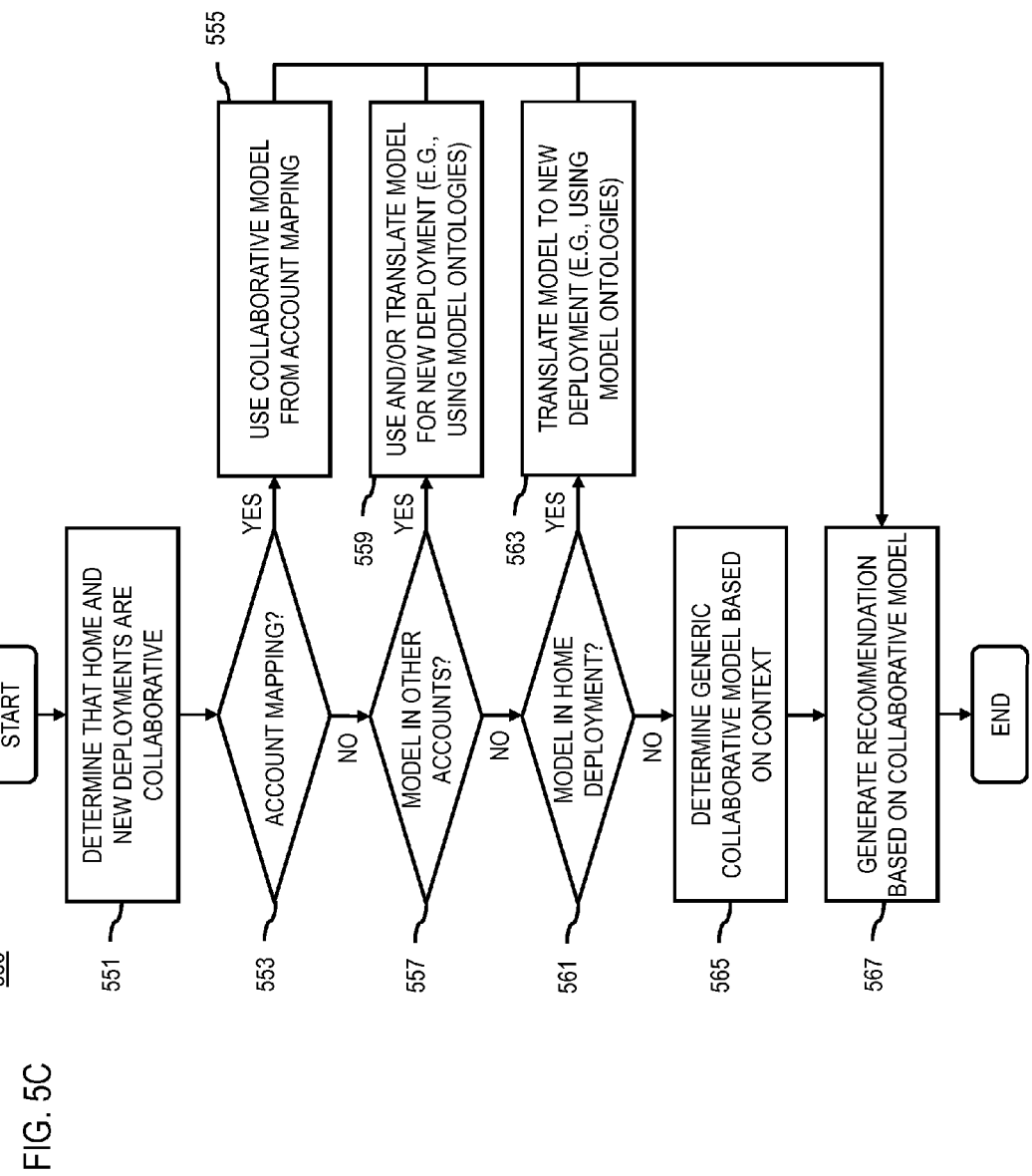

With respect to FIG. 5C, in step 551 of the process 550, the service platform 105 determines that a first set of service components associated with the home service deployment 101 includes at least one collaborative recommendation model and that a second set of service components associated with the new service deployment 101 also includes at least one collaborative recommendation model. Next, the service platform 105 determines user account information, user profile information, or a combination thereof associated with the device (e.g., the UE 109) or service client 113, the first deployment 101 (e.g., the home deployment 101), the second deployment (e.g., the new deployment 101), a central server associated with the service (e.g., the service platform 105), or a combination thereof. The service platform 105 then processes and/or facilitates a processing of the user account information, the user profile information, or a combination thereof to determine at least one user collaborative model for use with the at least one other collaborative recommendation model of the new service deployment 101.

More specifically, if user account mapping is available between the home service deployment 101 and the new service deployment 101 (step 553), the service platform 105 can use the collaborative model resulting from the account mapping to make recommendations with respect to the new service deployment 101 (step 555). In step 557, the service platform 105 can also check other accounts (e.g., external or generic service accounts) to see if a collaborative mode exists for the user and if the ontologies of the models of home service deployment 101 and the new service deployment 101 are at least substantially the same or otherwise compatible, the collaborative model can be used and/or translated for the new service deployment 101 (step 559).

In one embodiment, if a compatible collaborative model already exists in the service platform 105, the service platform 105 can generate the recommendation based, at least in part, on the existing model for transmission to the new service deployment 101.

If no user account or user collaborative model exists for the user at the service platform 105 or other service account, the service platform 105 can source the user collaborative model (e.g., a user profile vector) from the home service deployment 101 (step 561). As part of this process, the service platform 105 determines one or more ontologies associated with the at least in one collaborative recommendation model, the at least one other collaborative recommendation model, or a combination thereof. The service platform 105 then processes and/or facilitates a processing of the one or more ontologies to translate the at least one user collaborative model for use with the at least one other collaborative model (e.g., associated with the new service deployment 101) (step 563).

If no information or collaborative models is available in the home service deployment 101, the new service deployment 101, and/or the service platform 105, the service platform 105 can use context data (e.g., location, time, activity, etc.) for selecting a collaborative model or otherwise generating recommendations at the new service deployment 101 (step 565). The service platform 105 then uses the collaborative model or models obtained via the processes described above to make collaborative recommendations at the new service deployment 101 or on behalf of the new service deployment 101 (step 567). In one embodiment, the recommendation would be from the items (e.g., content items, URL, etc.) supported by the new service deployment 101.

Figure 5D:
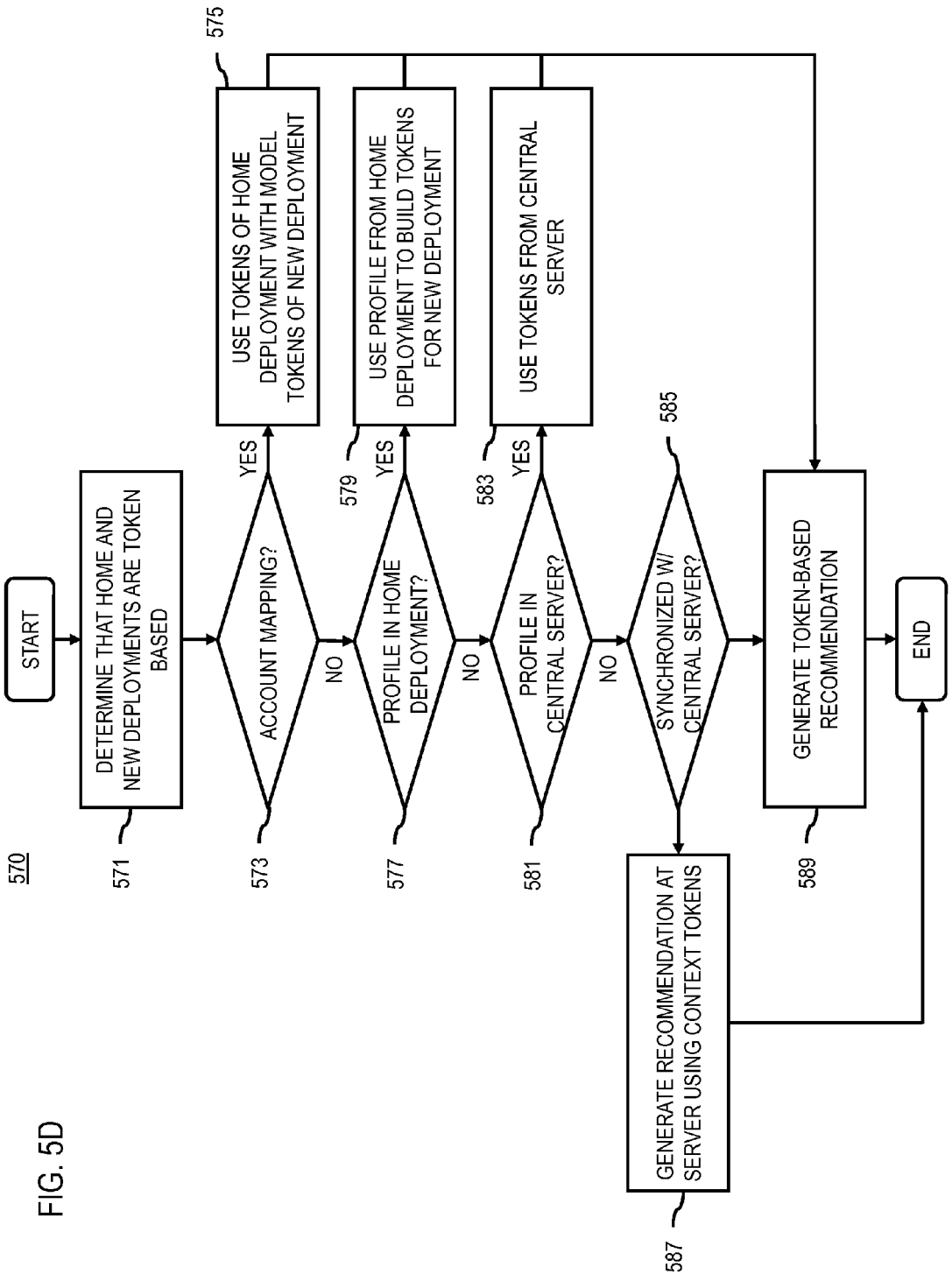

With respect to FIG. 5D, in step 571 of the process 570, the service platform 105 determines that a first set of service components associated with the home service deployment 101 includes at least one token-based recommendation model and that a second set of service components associated with the new service deployment 101 also includes at least one token-based recommendation model. Next, the service platform 105 determines user account information, user profile information, or a combination thereof associated with the device (e.g., the UE 109) or service client 113, the first deployment 101 (e.g., the home deployment 101), the second deployment (e.g., the new deployment 101), a central server associated with the service (e.g., the service platform 105), or a combination thereof. The service platform 105 then processes and/or facilitates a processing of the user account information, the user profile information, or a combination thereof to determine one or more tokens for use with the at least one other token-based recommendation model of the new service deployment 101.

More specifically, if user account mapping is available between the home service deployment 101 and the new service deployment 101 (step 573), the service platform 105 can use the tokens from the user profile information determined from the account mapping for use with model tokens in the new service deployment 101 (step 575). If account mapping is not available or cannot be performed, then the service platform 105 can retrieve user preference and/or profile information from the home service deployment 101 (step 577) to build tokens for the new service deployment 101 (step 579). If not profile or preference tokens can be fetched from the home service deployment 101, the service platform 105 checks whether it (e.g., as the central server for the service 103) has any profile information associated with the user of the service client 113 (step 581). The service platform 105 can then use the profile tokens (e.g., if directly available) and/or extract the tokens from the profile information for generating recommendations (step 583).

If no profile tokens can be extracted, the service platform 105 can use location and other context-specific tokens for use in generating recommendation when profile and/or preference tokens are unavailable. In one embodiment, the context specific recommendation can be provided either by the service platform 105 or the new service deployment 101. For example, if the service platform 105 has token/model synchronization with the home or new service deployments 101 (step 585), the service platform 105 may provide the recommendation because it may support additional contextual tokens and/or is more powerful (e.g., computationally powerful) than the new service deployment 101 (step 587). If there is no synchronization enabled, then the service platform 105 and/or the new service deployment 101 generates the token-based recommendation without using user profile and/or preference information (step 589).

Figure 6:
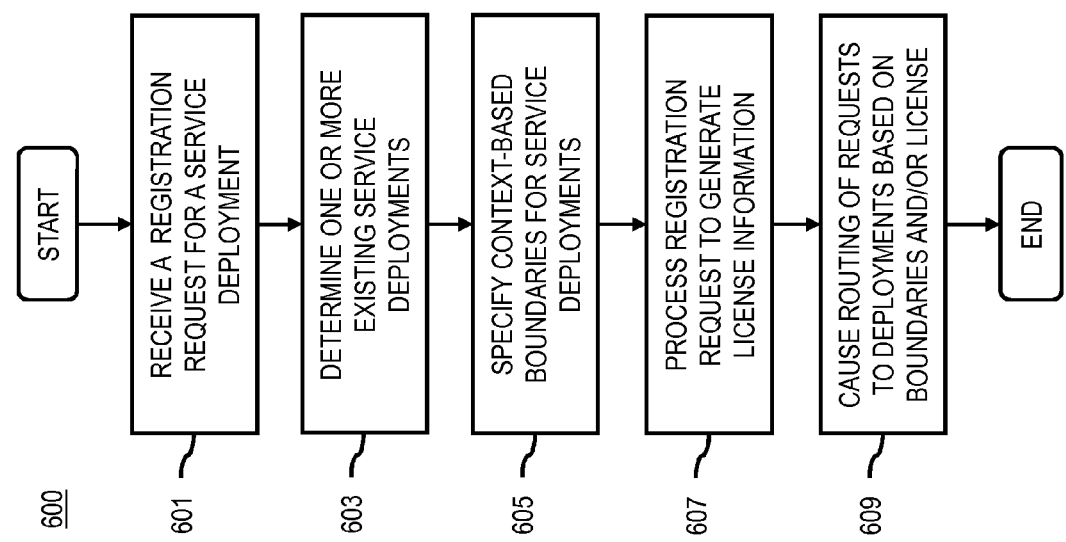
FIG. 6 is a flowchart of a process for registering a service deployment for service management under context-based boundaries, according to one embodiment.

FIG. 6 is a flowchart of a process for registering a service deployment for service management under context-based boundaries, according to one embodiment. In one embodiment, the service platform 105 performs the process 600 and is implemented in, for instance, a chip set including a processor and a memory as shown in FIG. 11. In addition or alternatively, the service deployments 101 can perform all or a portion of the process 600.

In step 601, the service platform 105 receive a registration request from at least one of the one or more deployment instances, the request specifying at least one of the one or more context-based boundaries. In some embodiments, the context-based boundaries are unique and do not substantially overlap. In yet other embodiments, the context-based boundaries are defined based, at least in part, on location, time, activity, other contexts, or a combination thereof.

By way of example, for location-based boundaries, it is contemplated that the request may include one or more parameters for specifying a central coordinate location of the deployment and an associated radius. As described previously, other registration parameters include, at least in part, license information, service deployment address, optional management address, settings to enable or disable account mapping, recommendation models or rules employed, re-routing information for service breakage (e.g., the service platform 105 can be a default re-routing location if one or more of the service deployments 101 are unavailable), etc.

In step 603, the service platform 105 determines one or more service deployments 101 of the requested service 103. As part of this process, the service platform 105 can also determine the context-based boundaries of the one or more deployment instances. The service platform 105 can then determine whether the requested boundary for the new service deployment 101 is compatible with existing boundaries (and covered by, e.g., license terms). Based, at least in part, on this determination, the service platform 105 causes, at least in part, specification of one or more context-based boundaries for operating the one or more deployment instances (step 605). For example, this specification can be based on the requested boundary if compatible, or the service platform 105 can adjust (e.g., reduce) the boundary to fit in with the existing boundaries if supported by the licensing agreements. In addition or alternatively, the service platform 105 can adjust one or more of the existing boundaries to accommodate the requested boundary of the new service deployment 101.

In one embodiment, the service platform 105 also processes and/or facilitates a processing of the registration request to validate/generate license information with respect to the at least one of the one or more deployment instances, the one or more context-based boundaries, or a combination thereof (step 607). In other words, the service platform 105 can encode the operating parameters (e.g., boundaries, types of licensed components such as models or data, etc.) in the license information associated with the service deployment 101. In some embodiments, the license information can be generated and/or determined before registration and/or installation of the service deployment 101. In this case, the parameters for initiating, managing, and/or operating the service deployment 101 can be determined from the license information rather than being used to generate the license information at the time of registration.

In one embodiment, the one or more service deployments are operated independently within their respective one or more context-based boundaries. In other words, the service components (e.g., rules, models, data sets, etc.) can be defined independently for each deployment 101. In addition, the service deployments may employ different business models for providing the same service. For example, one deployment 101 may use an advertisement supported business model, whereby users are not charged for use of the service. Other deployments may provide for tiered access with free access provides for a certain level of service and paid or premium access provide for a higher level of service. In addition, the service deployments 101 may be operated by different service providers (e.g., independent third party service providers) with each service deployment operating within a context-constrained deployment.

Although the service deployments 101 operate independently, in some embodiments, the service platform 105 (e.g., a central server operating separately from the service deployments 101) can initiate synchronization of one or more service components (e.g., models, data, rules, etc.) among the service platform 105, the service 103, and the service deployments 101. In this way, the components can be consolidated at the service platform 105 while enabling updating of the component at the service deployments 101. Accordingly, in one embodiment, the one or more service deployments 101 include, at least in part, data or components that are common to the service, other data or components that are specific to respective ones of the one or more service deployments 101, or a combination thereof. For example, if the service is a recommendation service, the associated service deployments may include one or more recommendation models common to the service, one or more other recommendation models specific to the one or more service deployments 101, or a combination thereof.

On completion of the registration and/or installation of the new service deployment 101, the service platform 105 then causes, at least in part, routing of one or more service requests to the one or more deployment instances based, at least in part, on the one or more context-based boundaries. For example, service requests from service clients 113 registered to specific service deployments 101 and/or operating within their respective context-based boundaries can be routed accordingly. As described previously, in some embodiments, service clients 113 operating outside of their home boundaries or service deployments 101 can have the option to have their service requests directed to their home service deployments 101 or to other service deployments 101. The routing process is described more detail with respect to FIG. 5 below.

Figure 7:
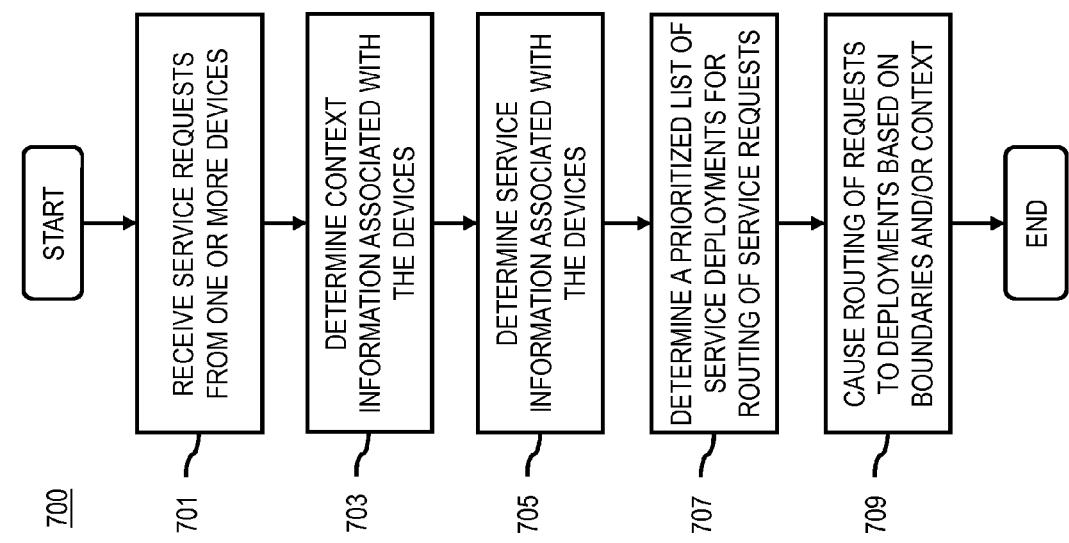
FIG. 7 is a flowchart for routing service requests based on context-based boundaries, according to one embodiment.

FIG. 7 is a flowchart for routing service requests based on context-based boundaries, according to one embodiment. In one embodiment, the service platform 105 performs the process 700 and is implemented in, for instance, a chip set including a processor and a memory as shown in FIG. 11. In addition or alternatively, the service deployments 101 can perform all or a portion of the process 700.

In step 701, the service platform 105 receives one or more service requests from one or more service clients 113 and/or UEs 109. By of example, the service clients 113 may send the requests directly to the service platform 105 (e.g., via a service URL), or the service requests may be relayed from one or more service deployments 101 (e.g., via their respective URLs). In one embodiment, the service platform 105 can then determine context information (e.g., location, time, etc.) associated with the service clients 113 and/or UEs 109 (step 703). The service platform 105 can use the context information for determining which context-based boundary or service deployment area the service client 113 is in.

In one embodiment, the service platform 105 can also determine service information (e.g., registered accounts, available services, level of service, etc.) associated with the requesting service client 113 and/or one or more associated users (step 705). By of example, this service information can include the user account information and services described with respect to Tables 1 and 2 above. The service platform 105 can then determine a prioritized list of the one or more service deployments 101 (e.g., deployment instances) based, at least in part, on the context information, service information, user preferences, service preferences, or a combination thereof (step 707). The service platform 105 can then route the service requests to the one or more service deployments 101 based on the prioritized list, context information, and associated context-based boundaries (step 709).

Figure 8A:
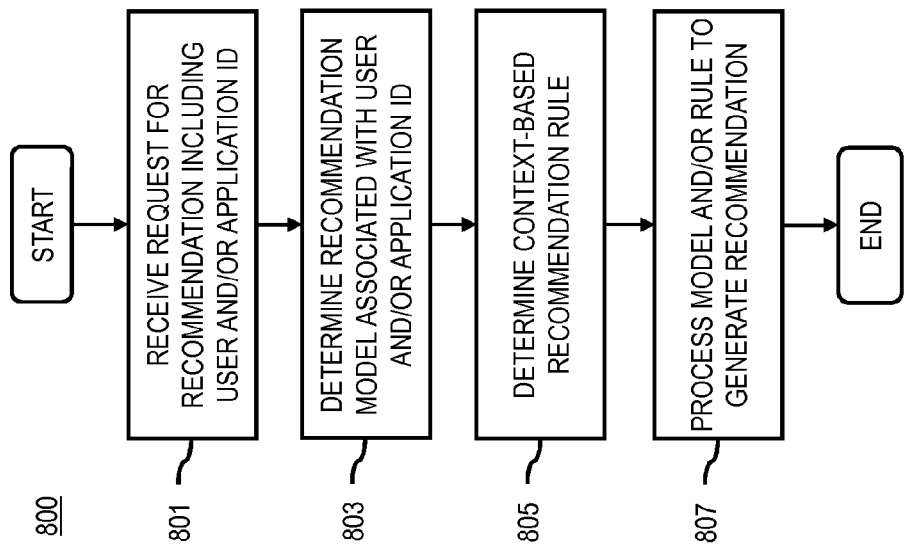
FIGS. 8A-8C are flowcharts of processes for providing recommendations based on a recommendation model and a context-based rule operating within context-based boundaries, according to one embodiment.
Figure 8B:
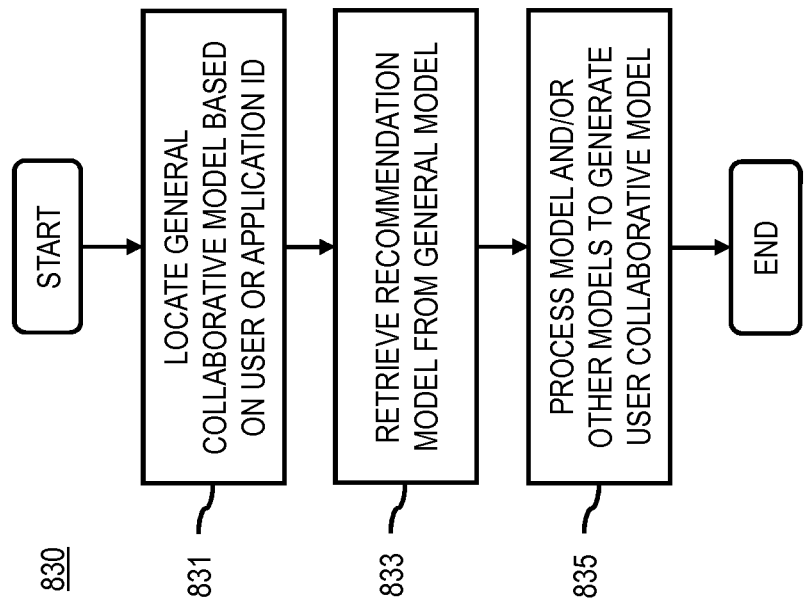
Figure 8C:
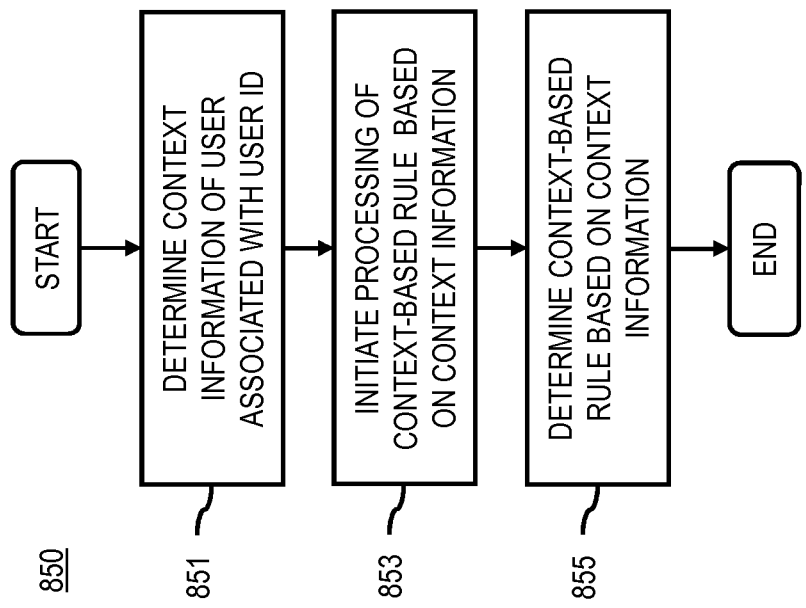

FIGS. 8A-8C are flowcharts of a process for providing recommendations based on a recommendation model and a context-based rule, according to one embodiment. The processes of FIGS. 8A-8C are example processes of a recommendation service that can be deployed according to the various embodiments described herein. In one embodiment, the service platform 105 performs the process 800 and is implemented in, for instance, a chip set including a processor and a memory as shown in FIG. 11. In addition or alternatively, the service deployments 101 may perform all or a portion of the processes. FIG. 8A is a flowchart of the overall process for providing recommendations based on a recommendation model and a context-based rule, according to one embodiment. In step 801, the service platform 105 receives a request for generating a recommendation, the request including a user identifier and/or an application identifier. Therefore, the recommendation may be specifically for the user and/or the application identified by the user identifier and/or the application identifier, respectively. The recommendation may relate to selection of applications executing at a device and/or items within the applications. For example, the recommendation may be a recommendation on a Christmas carol song if the service platform 105 determines that it is a Christmas season. In step 803, the service platform 105 determines a recommendation model associated with the user identifier and/or the application identifier. The recommendation model may be used to generate recommendations. For example, the recommendation model may include parameters that are basis for recommending certain applications and/or items of the applications, depending on the data on the user interaction with the application and/or the user's usage of the application. Then, in step 805, the service platform 105 determines a context-based recommendation rule. The context may include time, location, speed, user profile, user calendar, sound, etc. The recommendation rule may be based on the contexts. For example, the context-based recommendation rule may cause selection of one recommendation model for a user in the United States but a different recommendation model for a user in Finland. Then, in step 807, the service platform 105 causes processing of the recommendation model and/or the context-based recommendation rule for generating the recommendation. Thus, the recommendation may be generated based on both the recommendation model and the context-based recommendation rule.

FIG. 8B is a flowchart of a process of generating a user collaborative model, according to one embodiment. In step 831, the service platform 105 locates general collaborative model based on the user identifier and/or the application identifier. The general collaborative model may be built at the server end during a preprocessing stage. For example, the server end may retrieve collect user data, wherein the user data may include data about user interaction, user preference, user usage of applications, items of applications, etc. The server end may use this data to create the general collaborative model. The data may include the user identifier and/or application identifier, to specify a corresponding user and/or application. In an example where there are N users and M applications, general collaborative models having a N×T matrix may be created, wherein T is the number of latent factors used to factorize the models. Each of the N users may be identified by the corresponding user identifier, which is in each row of the N×T matrix. There is a T*M model for application models that are modeled using the same number of T latent factors. The combination of N*T and T*M forms the full collaborative model. Then, as shown in step 833, the service platform 105 retrieves the recommendation model from the general collaborative model based on the user identifier and/or the application identifier. If there are M applications identified by the application identifiers, then the recommendation model retrieved from the general collaborative model may include M number of 1×T recommendation models for the user identified by the user identifier. Then, in step 835, the service platform 105 processes the recommendation model and/or other recommendation models associated with the user identifier to generate the user collaborative model. In one example, these recommendation models may be aggregated to form a two-dimensional matrix of size M×T, because each of the recommendation models for M applications may be a 1×T matrix. This M×T matrix may be considered as the user collaborative model for the user identified by the user identifier. Thus, the user collaborative model may be organized by the M application identifiers corresponding to M appλications. The recommendation models and/or the user collaborative model made up of the recommendation models may be stored within the UE 109, the service platform 105, and/or the service deployments 101.

FIG. 8C is a flowchart of a process of determining the context-based recommendation rule, according to one embodiment. In step 851, the service platform 105 determineσ the context information associated with the user and/or the device associated with the user, wherein the user and/or the device associated with the user are associated with the user identifier. The context information may include the sensor data, calendar information, user profile, etc. The server end may include the context-based recommendation rules for various uσer identifiers. Therefore, the service platform 105 may retrieve appropriate context-based ρecommendation rules based on the user identifier. In step 853, the service platform 105 may initiate processing of the context-based recommendation rule based on changes to the context information. Thus, if there are changes to the context information in the UE 109, then this triggers processing of the context-based recommendation rule to reflect the changes. Then, in step 855, the context-based recommendation rule may be determined based on the context information.

Figure 9:
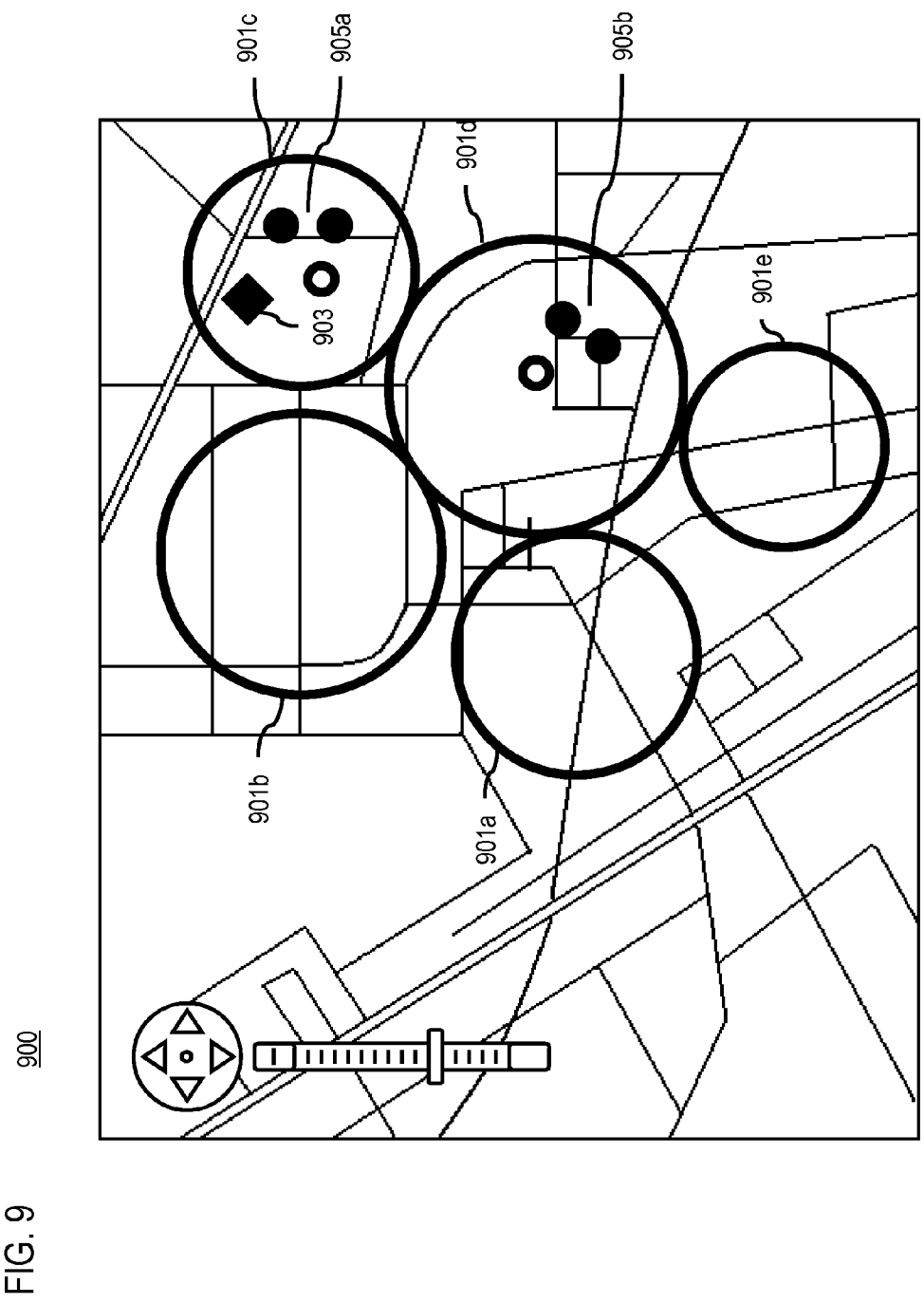
FIG. 9 is a diagram of a user interface for managing service deployments with context-based boundaries, according to one embodiment.

FIG. 9 is a diagram of a user interface for managing service deployments with context-based boundaries, according to one embodiment. FIG. 9 depicts a user interface 900 presenting a map view service deployments 101 available over a geographical area. In this example, the context-based boundaries are geo-fences whereby service boundaries are based on geographical coordinates and locations. As shown, each deployment 101 is represented by as respective boundaries 901a-901e. The circles are centered on the coordinates of the respective deployments 101, and the radius of the circle indicates the extent of the boundaries. In one embodiment, the map view is centered on the home base service deployment 101 (e.g., represented by the boundary 901c as indicated by the diamond icon 903). The map view can be navigated to whatever region of the map is desired.

The map view also indicates users within the boundaries as graphical icons (e.g., the group of circle icons 905a, and the group of circle icons 905b). In this example, the solid circle icons represent users that are within their home boundaries or home service deployments 101, and the hollow circle icons represent users who have crossed boundaries or fences into another non-home service deployment 101. In this way, the map view can represent geo-crossers as well as home users accessing the service deployments 101.

In another embodiment, the boundaries 901*a*-901*b* can be stylized (e.g., shaded in a different color, etc.) to indicate the type of service options available from a particular service deployment 101. For example, in a recommendation service, the shading can indicate what recommendation models are used or inherited in particular deployments 101.

The processes described herein for providing service mobility across service deployment boundaries may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
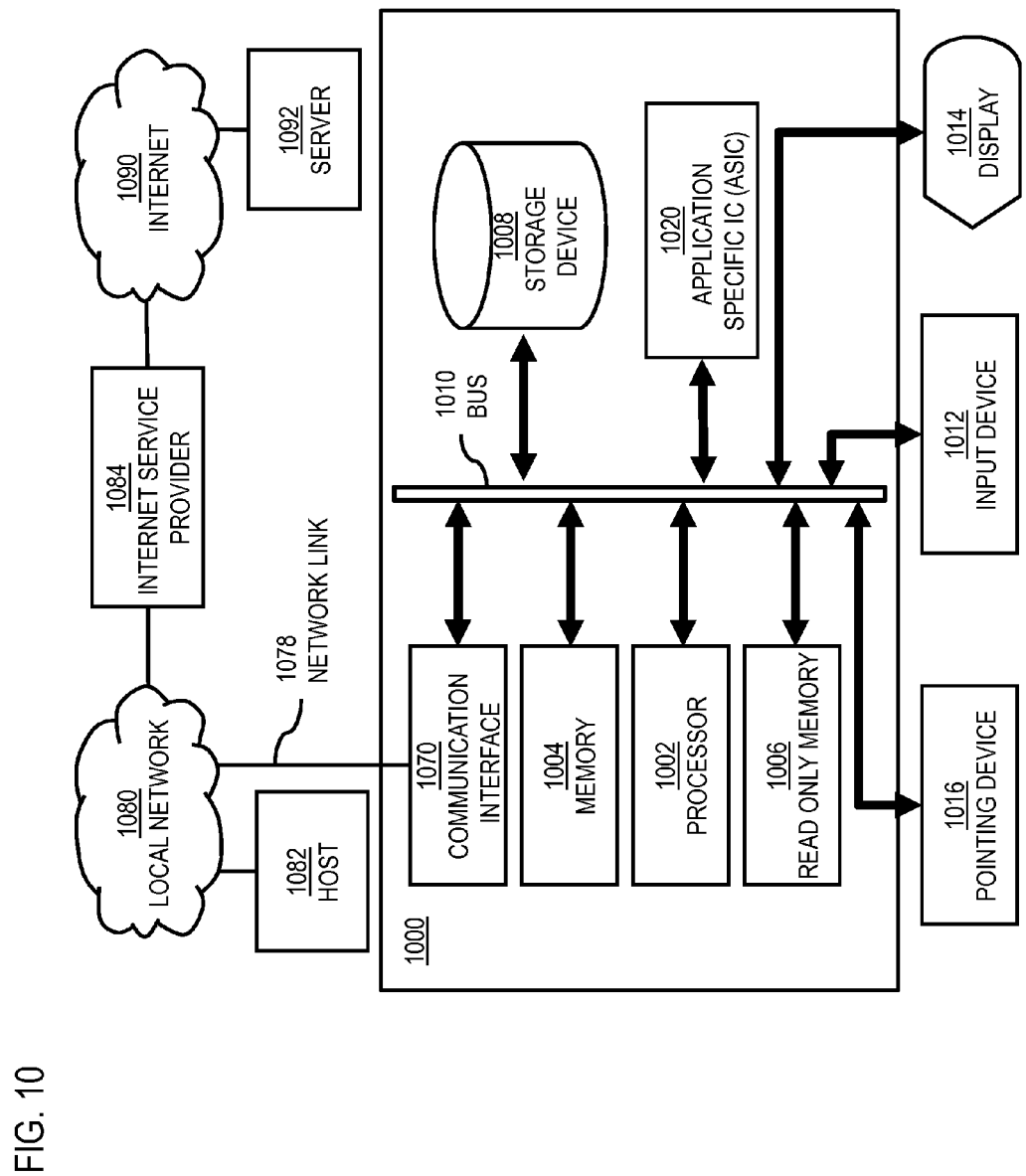
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide service mobility across service deployment boundaries as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing service mobility across service deployment boundaries.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to provide service mobility across service deployment boundaries. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for providing service mobility across service deployment boundaries. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing service mobility across service deployment boundaries, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for providing service mobility across service deployment boundaries.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide service mobility across service deployment boundaries as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing service mobility across service deployment boundaries.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to providing service mobility across service deployment boundaries. The memory 1105 also stores the data associated with or generated by the execution of the inventive steps.

Figure 12:
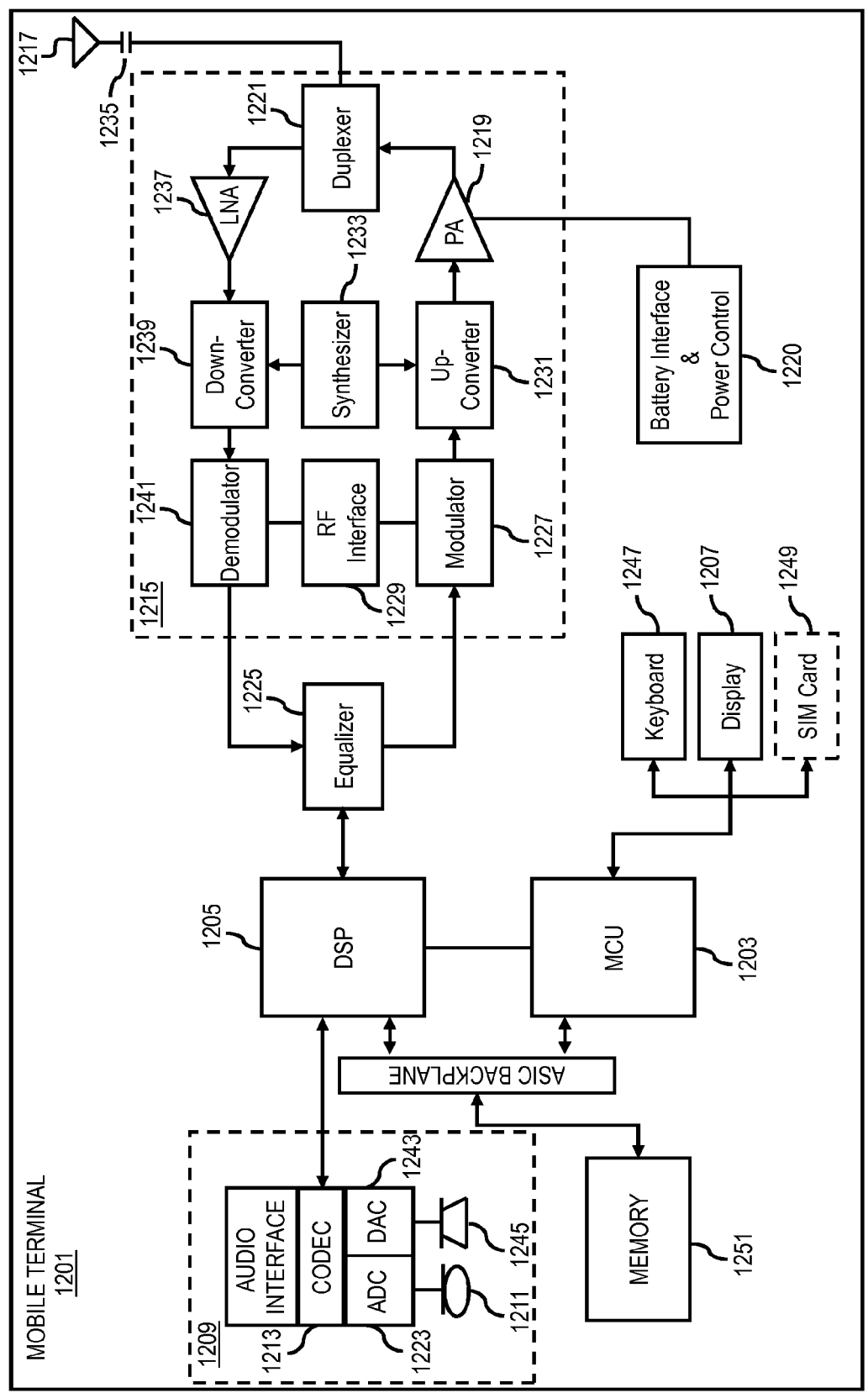
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of providing service mobility across service deployment boundaries. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory (ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing service mobility across service deployment boundaries. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide service mobility across service deployment boundaries. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
  facilitating a processing of and/or processing (1) data and/or (2) information and/or (3) at least one signal, the (1) data and/or (2) information and/or (3) at least one signal based, at least in part, on the following:
  a service request from a device, wherein the device has migrated from a first deployment of a service to a second deployment of the service;
  a first set of one or more service components associated with the first deployment including a first recommendation model and a second set of one or more service components associated with the second deployment including a second recommendation model;
  a processing of the first set to conform to the second set using at least one translation model that compares one or more tokens of the first recommendation model against one or more tokens derived from the second recommendation model; and
  a processing of the service request at the second deployment based, at least in part, on the conforming of the first set to the second set.

2. A method of claim 1, wherein the service includes a recommendation service.

3. A method of claim 2, wherein the (1) data and/or (2) information and/or (3) at least one signal are further based, at least in part, on the following:

at least one determination that the first and second recommendation models include at least one collaborative recommendation model and at least one token-based recommendation model;

user account information, user profile information, or a combination thereof associated with the device, the first deployment, the second deployment, a central server associated with the service, or a combination thereof; and a processing of the user account information, the user profile information, or a combination thereof to determine one or more tokens for use with the at least one token-based recommendation model.

4. A method of claim 3, wherein the (1) data and/or (2) information and/or (3) at least one signal are further based, at least in part, on the following:

at least one determination of the one or more tokens from a general list of tokens, when the collaborative recommendation model and the token-based recommendation model are not compatible.

5. A method of claim 2, wherein the (1) data and/or (2) information and/or (3) at least one signal are further based, at least in part, on the following:

at least one determination that the first and second recommendation models include at least one token-based recommendation model and at least one collaborative recommendation model;

user account information, user profile information, user context information, or a combination thereof associated with the device, the first deployment, the second deployment, a central server associated with the service, or a combination thereof; and a processing of the user account information, the user profile information, the user context information, or a combination thereof to determine at least one user collaborative model for use with the at least one collaborative recommendation model.

6. A method of claim 5, wherein the (1) data and/or (2) information and/or (3) at least one signal are further based, at least in part, on the following:

a processing of one or more user tokens from the at least one token-based recommendation model for comparison against one or more other tokens associated with one or more other collaborative recommendation models; and a selection of the at least one user collaborative recommendation model from among the one or more other collaborative recommendation models based, at least in part, on the comparison.

7. A method of claim 2, wherein the (1) data and/or (2) information and/or (3) at least one signal are further based, at least in part, on the following:

at least one determination that the first and second recommendation models include at least one collaborative recommendation model and at least one other collaborative recommendation model;

user account information, user profile information, user context information, or a combination thereof associated with the device, the first deployment, the second deployment, a central server associated with the service, or a combination thereof; and a processing of the user account information, the user profile information, the user context information, or a combination thereof to determine at least one user collaborative recommendation model for use with the at least one other collaborative recommendation model.

8. A method of claim 7, wherein the (1) data and/or (2) information and/or (3) at least one signal are further based, at least in part, on the following:

one or more ontologies associated with the at least one collaborative recommendation model, the at least one other collaborative recommendation model, or a combination thereof;

a processing of the one or more ontologies to translate the at least one user collaborative recommendation model for use with the at least one other collaborative recommendation model.

9. A method of claim 2, wherein the (1) data and/or (2) information and/or (3) at least one signal are further based, at least in part, on the following:

at least one determination that the first and second recommendation models include at least one token-based recommendation model and at least one other token-based recommendation model;

user account information, user profile information, user context information, or a combination thereof associated with the device, the first deployment, the second deployment, a central server associated with the service, or a combination thereof; and a processing of the user account information, the user profile information, the user context information, or a combination thereof to determine one or more tokens for use with the at least one other token-based recommendation model.

10. A method of claim 2, wherein the (1) data and/or (2) information and/or (3) at least one signal are further based, at least in part, on the following:

at least one determination to retrieve at least one of the first and second recommendation models from the device.

11. An apparatus comprising:

at least one processor; and at least one memory including computer program code for one or more programs, the at least one memory and the computer program code configured to, with the at least one processor, cause the apparatus to perform at least the following, receive a service request from a device, wherein the device has migrated from a first deployment of a service to a second deployment of the service;

determine a first set of one or more service components associated with the first deployment including a first recommendation model and a second set of one or more service components associated with the second deployment including a second recommendation model;

process and/or facilitate a processing of the first set to conform to the second set using at least one translation model that compares one or more tokens of the first recommendation model against one or more tokens derived from the second recommendation model; and cause, at least in part, processing of the service request at the second deployment based, at least in part, on the conforming of the first set to the second set.

12. An apparatus of claim 11, wherein the service includes a recommendation service.

13. An apparatus of claim 12, wherein the apparatus is further caused to:

determine that the first and second recommendation models include at least one collaborative recommendation model and at least one token-based recommendation model;

determine user account information, user profile information, or a combination thereof associated with the device, the first deployment, the second deployment, a central server associated with the service, or a combination thereof; and process and/or facilitate a processing of the user account information, the user profile information, or a combination thereof to determine one or more tokens for use with the at least one token-based recommendation model.

14. An apparatus of claim 13, wherein the apparatus is further caused to:

determine the one or more tokens from a general list of tokens, when the collaborative recommendation model and the token-based recommendation model are not compatible.

15. An apparatus of claim 12, wherein the apparatus is further caused to:

determine that the first and second recommendation models include at least one token-based recommendation model and at least one collaborative recommendation model;

determine user account information, user profile information, user context information, or a combination thereof associated with the device, the first deployment, the second deployment, a central server associated with the service, or a combination thereof; and process and/or facilitate a processing of the user account information, the user profile information, the user context information, or a combination thereof to determine at least one user collaborative model for use with the at least one collaborative recommendation model.

16. An apparatus of claim 15, wherein the apparatus is further caused to:

process and/or facilitate a processing of one or more user tokens from the at least one token-based recommendation model for comparison against one or more other tokens associated with one or more other collaborative models; and cause, at least in part, selection of the at least one user collaborative recommendation model from among the one or more other collaborative recommendation models based, at least in part, on the comparison.

17. An apparatus of claim 12, wherein the apparatus is further caused to:

determine that the first and second recommendation models include at least one collaborative recommendation model and at least one other collaborative recommendation model;

determine user account information, user profile information, user context information, or a combination thereof associated with the device, the first deployment, the second deployment, a central server associated with the service, or a combination thereof; and process and/or facilitate a processing of the user account information, the user profile information, the user context information, or a combination thereof to determine at least one user collaborative recommendation model for use with the at least one other collaborative recommendation model.

18. An apparatus of claim 17, wherein the apparatus is further caused to:

determine one or more ontologies associated with the at least one collaborative recommendation model, the at least one other collaborative recommendation model, or a combination thereof;

process and/or facilitate a processing of the one or more ontologies to translate the at least one user collaborative recommendation model for use with the at least one other collaborative recommendation model.

19. An apparatus of claim 12, wherein the apparatus is further caused to:

determine that the first and second recommendation models include at least one token-based recommendation model and at least one other token-based recommendation model;

determine user account information, user profile information, user context information, or a combination thereof associated with the device, the first deployment, the second deployment, a central server associated with the service, or a combination thereof; and process and/or facilitate a processing of the user account information, the user profile information, the user context information, or a combination thereof to determine one or more tokens for use with the at least one other token-based recommendation model.

20. A method of claim 3, wherein the (1) data and/or (2) information and/or (3) at least one signal are further based, at least in part, on the following:

at least one determination of the one or more tokens for use with the token-based recommendation model from a general list of tokens providing functions similar to functions of the at least one token-based recommendation model, when the collaborative recommendation model and the token-based recommendation model are not compatible.

* * * * *